(12) United States Patent
Mothwurf

(10) Patent No.: US 7,016,861 B2
(45) Date of Patent: *Mar. 21, 2006

(54) DISPENSING APPARATUS FOR DISPENSING TICKETS IN REPONSE TO AN EVENT

(75) Inventor: Ewald Mothwurf, Unterer Plattenweg 14, Graz (AT) A-8043

(73) Assignee: Ewald Mothwurf, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 10/929,069

(22) Filed: Aug. 26, 2004

(65) Prior Publication Data

US 2005/0033642 A1    Feb. 10, 2005

Related U.S. Application Data

(62) Division of application No. 10/355,484, filed on Jan. 31, 2003, which is a division of application No. 09/496,576, filed on Feb. 2, 2000, now Pat. No. 6,578,735.

(51) Int. Cl.
B65G 59/00    (2006.01)

(52) U.S. Cl. ................. 705/14; 221/255; 221/303

(58) Field of Classification Search ............ 705/14; 221/13, 22, 25, 26, 63, 255, 303; 463/17, 463/20
See application file for complete search history.

(56) References Cited

U.S. PATENT DOCUMENTS

| | | | |
|---|---|---|---|
| 4,087,092 A | 5/1978 | Krause | |
| 4,697,726 A | 10/1987 | Gaucher | |
| 4,982,337 A | 1/1991 | Burr | |
| 5,365,575 A | 11/1994 | Katz | |
| 5,494,294 A | 2/1996 | Cappetta | |
| 5,836,498 A | 11/1998 | Turek | |
| 5,950,898 A | 9/1999 | Menna | |
| 6,007,426 A | 12/1999 | Kelly | |
| 6,017,032 A | 1/2000 | Grippo | |
| 6,056,289 A | 5/2000 | Clapper | |
| 6,161,743 A | 12/2000 | Shoemaker | |
| 6,293,424 B1 | 9/2001 | Love | |

FOREIGN PATENT DOCUMENTS

EP    1 122 693 A2    8/2001
WO    WO 99/52691 A1    10/1991

Primary Examiner—Jean D. Janvier
(74) Attorney, Agent, or Firm—Townsend and Townsend and Crew LLP

(57) ABSTRACT

A ticket dispensing apparatus 30 for dispensing tickets in response to an event comprising a vertically extending housing or structure 44 serving to accommodate advertising displays and a lower mouth section 53 resembling an open bird's beak inside view with two dispensing slots 50 and 52 being provided in the throat region 54 of the open mouth 56. The first slot 50 serves to issue a prize ticket 58 associated with a game of chance related to an event or to a promotion of a particular product or brand of products or to promotional activity of a related store. The second dispensing slot 52 serves to dispense a lottery ticket 60, which has been specifically purchased by the customer as part of his purchases at the cash till. Furthermore, the apparatus could be reduced to a single dispensing slot 50 if it is intended only for promotional activities in accordance with the invention.

42 Claims, 11 Drawing Sheets

DISPENSING APPARATUS FOR DISPENSING TICKETS IN REPONSE TO AN EVENT

BACKGROUND OF THE INVENTION

The present invention relates to a method of promoting a product or a brand in a retail store, to a method of promoting customer loyalty to a retail store or chain of stores or sales outlet, to apparatus for use in such methods and to alternative uses of such apparatus.

A wide range of promotional concepts are known and used in retail stores and sales outlets for specific products, such as a stand dedicated to the sale of a particular range of products, for example ties, in an airport.

Advertisements range from static advertising boards to illuminated or highlighted advertisements and to advertisements with mobile features aimed at capturing the attention of customers in a store or at a sales outlet.

The advertisements are sometimes directed to a single product, or to a brand of products, and sometimes take the form of advertising by a retail store on its own behalf, frequently coupled with price reductions or the like.

It is also known for retail stores to reduce the price of certain articles for a certain period in the day, a so-called happy hour.

SUMMARY OF THE INVENTION

It is an object of the present invention to provide improved methods of promoting a product or a brand in a retail store and customer loyalty to a retail store or chain of stores, as well as apparatus for carrying out the method, which provide the customers with more incentive to purchase specific products or brands or to remain loyal to a particular store or chain of stores or sales outlet.

It is a further object of the present invention to provide methods and apparatus for motivating customers to make specific purchase decisions.

It is a yet further object of the present invention to make shopping more exciting for customers.

It is a further object of the invention to apply these promotion and advertising methods to the world of e-commerce by a multi-media version of the apparatus.

It is a yet further object of the invention to provide methods and apparatus of the above kind which are particularly suited to the way retail stores and chains of stores are organized and which relieve the management of such retail stores or chains of administrative effort in connection with the promotion activity.

It is a further object of the present invention to provide apparatus of a general type which can be used not only for the above purposes, but also for the issue of lottery tickets or other forms of tickets and which can be configured, for example, as a gaming machine.

Other objects and advantages of the invention will become apparent from the following description.

In order to satisfy the above objects there is provided, in accordance with a first aspect of the invention, a method of promoting a product or a brand in a retail store comprising the steps of analyzing data determined at a point of sale relating to purchases by a customer, e.g. data from a barcode scanner, to determine whether a customer has purchased a particular product or brand or has purchased products equaling or exceeding a predetermined value and, if this is the case, entitling the customer to participate in a prize/bonus ticket game configured as a game of chance, conducting a game of chance based on a predetermined win table having a specified number of predetermined winning numbers each associated with a bonus or prize and a further number of no win stops, i.e. numbers which are not winning numbers, and in the case of a win, issuing to the customer a lottery ticket which is a winning ticket associated with the product or product range.

The invention is thus based on the concept that the promotion of a particular product or brand of products can be made more exciting for the customer and more effective because of enhanced customer interest if the customer is entitled, on purchasing a product or brand, to participate in a game of chance which gives the opportunity for the customer to win a prize, with the validation of prizes taking place via a type of lottery ticket.

The invention has recognized that many customers purchase scratch card-type lottery tickets at points of sale, for example at cash tills of supermarkets or large stores, and engage, of their own volition, in games of chance. The present invention has recognized that this type of behavior can be used to great effect as an advertising medium, not just promoting the interests of the lottery company, but also basically the interests of any manufacturer of any product or brand or, as will be seen later, the sales promotion of a store or chain of stores or indeed of any sales outlet, be it a tie shop in an airport or a newspaper shop on the corner.

More specifically, general advertising can be carried out so that a customer is aware that purchase of a particular product or brand may entitle him to participate in a game of chance. Even if the customer is aware that such promotion is running he may, of his own volition, purchase the relevant brand or product. At the point of sale customer purchases will normally be scanned by a barcode scanner. Information on the identity of the products purchased is thus available to a computer system through the barcode scanner. Thus, the information produced by the barcode scanner can be checked to see whether the customer has purchased a particular product or brand, or products equaling or exceeding a predetermined value, and, if this is the case, can trigger a signal which entitles the customer to participate in a prize/bonus ticket game configured as a game of chance.

The fact that the customer is entitled to participate in such a game of chance, as a result of his purchases, can be signaled to the customer, and indeed to other customers in a retail store or sales outlet in a wide variety of ways, and in particular by the step of operating at least one display or advertisement associated with the product or brand. The game of chance is conducted on the spot and a decision is made, also on the spot, as to whether the customer has won or lost. If the result is a loss, that is the end of the game and no ticket is issued. In the event of a win a ticket is issued to the customer giving details of the win. The issue of a winning ticket can again be coupled to the operation of at least one display or advertisement associated with the product or brand. Again, this is intended to promote customer awareness of the promotion that is running and to encourage other customers to purchase the products and thus to participate in the game of chance and have the possibility of a win.

The win associated with the game of chance is recorded on the ticket, which can itself be configured as a scratch card ticket (but must not be so configured) and thus the customer is immediately able to check what he has won at the point of sale. Frequently, the win will simply be a small win, such as a small rebate on the purchases made by the customer, or a small sum of money, or the entitlement to purchase more of the article concerned at half price or something of this nature. Such small wins will usually be paid out by the retail store or sales outlet on the spot.

When the winning ticket is associated with a high win, for example a television set, or a car or a vacation, then the customer will normally be expected to send the ticket to a company responsible for payment of the win.

By applying codes to the winning tickets, for example a barcode, it is possible for the company responsible for payment of the win to check that the winning ticket is indeed a valid winning ticket and not a forgery. Clearly the prize is only transferred to the customer when the ticket has been authenticated.

Because a customer learns of his win at the point of sale, the excitement associated with a win will be apparent to other customers, particularly when a major win is involved. It will thus, on the one hand, motivate these other customers to participate in the promotion, or will at least enhance the chances of them remaining loyal to the store or sales outlet where such a promotion is running. At the very least, the air of excitement will help convert the shopping activity from a frequently dreary task to a more exciting prospect.

In a similar manner it is possible for a retail store or chain of stores to use similar techniques for promoting their own sales activities. Thus, an advertising campaign on behalf of a store or chain of stores, or indeed on behalf of any sales outlet, can be configured by the store, or chain of stores, or sales outlet, or by their management, or by advertising consultants, such that a whole range of different inputs can trigger a game of chance for a customer.

Thus, according to a second aspect of the invention, there is provided a method of promoting customer loyalty to a retail store, or chain of stores, or sales outlet comprising the steps of analyzing data determined at a point of sale relating to purchases by a customer, e.g. data from a bar-code scanner, to determine whether the customer has purchased a predetermined article or an article having a predetermined value or articles having a total value equal to or exceeding a predetermined value and, if this is the case, entitling the customer to participate in a prize/bonus ticket game configured as a game of chance, conducting a game of chance based on a predetermined win table having a specified number of predetermined winning numbers each associated with a bonus or prize and a further number of no win stops, i.e. numbers which are not winning numbers and, in the case of a win, issuing to the customer a ticket which is a winning ticket entitling the customer to a bonus or prize.

Accordingly, the purchase by a customer of any article, or an article having a predetermined value, or articles having a total value equal to or exceeding a predetermined value, can for example be detected by a bar scanner, or otherwise, and recognized as the entitlement to participate in a game of chance, which then runs in the same way as described above. In addition, in retail stores or chains of stores which issue cards to their customers, for example as loyalty cards or points cards in connection with a purchase incentive scheme, or as credit cards, the customer's card can be scanned and can itself trigger a game of chance, simply on the basis that the customer is a loyal customer. If the customer card is of a kind enabling the storage of data relating to previous purchases, then the entitlement to participate in a game of chance can be made dependent on the stored data relating to the previous purchases by the customer. Particularly valuable customers can be rewarded in various ways, such as, for example, the possibility of participating in several games of chance, or by modifying the rules of the game of chance so that a loyal customer has a higher chance of winning.

It is a particularly important concept of the present invention that the method and apparatus used for carrying out the method can be set up in a way which is, on the one hand, compatible with normal business activity in a retail store or outlet and, on the other hand, involves a high degree of security with little administrative effort on behalf of the management of the retail store or sales outlet. Moreover, it is important to achieve a high level of operational reliability.

This can in particular be achieved, in accordance with a further aspect of the invention, by the use of a ticket dispenser for a game of chance comprising a housing, a space within said housing for receiving a pack of tickets in any form, e.g. in fanfold form or in roll form, a dispensing mechanism for dispensing single tickets taken from said pack of tickets, an electronic control associated with the dispenser comprising stored information relating to said game of chance, a ticket reader for reading identification information stored on said tickets, means for comparing said information with identifying information stored in said electronic control to check whether the pack of tickets is a valid pack and/or whether each ticket is a valid ticket, and means for inhibiting said dispensing mechanism if said pack of tickets and/or an individual ticket is not a valid pack of tickets or a valid individual ticket respectively.

It is particularly beneficial if the electronic control includes a chipcard associated with the or each pack of tickets, with information being stored on the chipcard.

Since the electronic control contains information identifying valid tickets, it is possible to check electronically that a valid pack of tickets is present in the ticket dispenser, that a full packet of tickets is dispensed and that no tickets are missing, which could indicate tampering by a third party. A ticket will only be issued when it is identified by the software stored in the electronic control as a valid ticket. If the ticket dispenser is designed to issue a variety of tickets, for example tickets relating to a specific promotion from one shaft and normal lottery tickets from another shaft, then it is possible for the software to check that the person loading the tickets into the machine has put the correct tickets into the correct shaft.

Moreover, it is possible for the software to check that the tickets that have been inserted into the ticket dispenser are those that are related to the advertising campaign that is currently running and not, for example, tickets left over from last week's advertising campaign. The correct association of tickets to a specific advertising campaign is particularly important because each advertising campaign can be configured differently. The manufacturing or sales company will frequently wish to approve the rules by which the campaign will be run, which prizes will be made available to the customers and the rules for the game of chance, for example how frequently a win will occur. Moreover, since the tickets are all winning tickets, they will normally be pre-printed with wins relevant to the advertising campaign that is running. Fundamentally, it would, however, also be possible to print the nature of each win on each ticket as it is issued, i.e. by means of a printer incorporated in the ticket dispenser.

In addition to the tickets being associated with a particular advertising campaign the advertisements that are running in the retail store or at the sales outlet or point of sale will also generally be configured to support the advertising campaign. Thus, multi-media devices present in the retail store or at the sales outlet may be programmed to show certain video films or to display certain messages concerned with the advertising campaign. The electronic control is able to check whether the advertising appropriate to the advertising campaign is running and to inhibit the advertising if this is not the case, as well as indicating to an operator that something is amiss.

One particularly favorable aspect of the present invention is that it is possible to configure the ticket dispenser so that it is combined with an advertisement. For example the ticket dispenser can comprise a vertically extending structure serving as a mount for an interchangeable advertisement such as an interchangeable transparency bearing the advertisement or an interchangeable mask, sculpture or hood which is placed over the vertically extending structure and generally configured in a way drawing attention to the product or brand or sales campaign that is running. By providing an electronic feedback from the respective advertisement to the electronic control it is possible for the electronic control to check that the correct advertisement is in place for the advertising campaign that is running.

Means can also be provided for highlighting the advertisement, for example by the use of lights or movable elements or by audible means, and indeed such highlighting can be triggered either during specific time periods or whenever the game of chance is won or is being played.

It is particularly favorable when the electronic control can be accessed from a point remote from the point of sale or place where the ticket dispenser is located.

For example, the electronic control can contain a connection to a data network, for example the Ethernet, to link the data network to the point of sale terminals and from there to the wide area network of the chain of stores. For stores or points of sale not linked by a wide area network, the data transfer can be effected by a wireless modem typically used in portable phones and operating, e.g., in accordance with the known GSM system. Accordingly, a company responsible for administering the advertising campaigns and running the ticket dispensers can check from its offices whether the ticket dispenser is installed correctly, i.e. with the correct tickets, with the correct advertising campaign and carrying the correct sculptures or advertisements, and can indeed check whether the ticket dispenser is operating correctly. Thus checking is possible, from a central location, of a whole variety of ticket dispensers set up in a whole variety of different retail stores or points of sale and used to conduct different advertising campaigns at different times.

Indeed, it is possible for the company administering advertising campaigns (which can provide a service to advertising agencies employed by the manufactures of the products or brands being promoted, or by the chain of stores, or can itself be an advertising agency) to check that the correct campaign is running correctly at a whole variety of remote installations. Should problems be found, the company running the apparatus will operate a service and can call the store and ask to correct the problem or send its operators to the retail store or sales outlet in question to put things right. Thus, the retail store or sales outlet is relieved of administrative efforts in connection with the advertising campaign, and its role is basically reduced to one of making certain that the ticket dispenser is filled with the necessary packs of tickets and that the right advertising transparencies are in place.

Because the usage of the tickets is monitored by the electronic control, the company administrating the apparatus or the advertising campaign can also ensure that the particular store always has an adequate supply of tickets.

Moreover, because the store has electronic access to all the electronic data in the machine, it is also able to authenticate winning tickets, by reference to a code applied thereto, to ensure that they are genuine winning tickets and not fakes.

It is considered particularly favorable when the ticket dispenser is configured such that it can receive at least first and second packs of tickets with the dispensing mechanism being adapted to automatically change over from the first pack of tickets to the second pack of tickets when the first pack of tickets runs out. This design takes account of the fact that the cashier, who will normally be busy at the till, should not spend time replacing an empty pack of tickets with a full pack during his or her other duties. Thus, the reserve pack ensures that the refilling of tickets can be done (storewide) just once or only a few times a day and that the dispensing mechanism does not run out of tickets unnecessarily. On changeover to the second pack an indicator on the dispensing mechanism will inform the operator of the fact that another reserve pack must be put in the machine at the next round of refills.

It is particularly preferable when the ticket dispenser is used in combination with a point of sale including a cash till, a bar scanner for scanning barcodes on items purchased by a customer and when means are provided for transmitting information between the cash till and/or the bar scanner and the ticket dispenser. This means for transmitting information can comprise a data network and an electronic interface or a radio or infrared link.

In an arrangement of this kind a conveyor belt or other transport mechanism is provided alongside the cash till for conveying items purchased by a customer past a cashier seated at the cash till, with said ticket dispenser being provided behind said cashier when said cashier is seated at said cash till optionally at a position in line with said conveyor belt, wherein the front top part of the ticket shaft of said dispenser can be swung down into a horizontal position, the ticket loading position, in which access is provided for the loading of both ticket packets.

An arrangement of this kind permits the ticket dispenser to be installed at a position adjacent the cash till where it does not hinder the cashier's normal work and ensures that the associated advertising carried by it is within the field of view of the particular customer and other customers waiting at or in the vicinity of the point of sale.

Also in accordance with the invention there is provided a particularly preferred ticket dispenser adapted to automatically change over from a first pack of tickets to a second pack of tickets wherein each said pack of tickets comprises a continuous web of tickets, wherein a conveyor roll is provided in said ticket dispenser and extends transversely to a web conveying direction, wherein a first wall means is provided at one side of said conveyor roll and defines with said conveyor roll a first passage for conveying a first web of tickets belonging to said first pack of tickets, wherein a second wall is provided at an opposite side of said conveyor roll and defines with said conveyor roll a second passage for conveying a second web of tickets belonging to said second pack of tickets, there being actuating means for pressing a selected one of said first wall means and said second wall means towards said conveying roll to clamp the respective web therebetween for conveying movement in said conveying direction, and means for driving said conveyor roll in a first direction when said first web is to be conveyed and in a second direction when said second web is to be conveyed, whereby to produce in each case conveying movement of a selected one of said first and second webs in said conveying direction.

A ticket dispenser of this kind is particularly well adapted for use with so-called fanfold tickets but can also be used for dispensing tickets present on a roll. It is particularly advantageous that only one conveyor roll is required for conveying either of the two webs of tickets belonging to the first pack of tickets or the second pack of tickets and that only a single reading means, for example itself in the form of a bar-code scanner, is necessary to read codes applied to either web of tickets.

It is generally considered a rather difficult task to reliably separate tickets from a continuous web of tickets. On the one hand, the web of tickets has to have sufficient strength that it does not continually break and interfere with the operation of the ticket dispenser. On the other hand, the person receiving the ticket should not have to exert force to remove it and in any event a situation must be prevented in which the customer, by pulling on the ticket, receives two or more tickets when only one is intended for him.

In order to provide reliability in separating the tickets from the webs of tickets there is provided, in accordance with the present invention, a ticket dispenser including means disposed downstream of said conveyor roll in said direction of conveying movement for bending a conveyed ticket at a leading end of one of said first and second webs to and fro about a line of weakness for the intended separation from said web to weaken a connection between said leading ticket and said web prior to separating said leading ticket.

The invention is described by way of example only and in more detail with reference to a specific embodiment shown in the drawings which represents the best mode of practicing the invention currently known to the applicant.

DESCRIPTION OF THE PREFERRED EMBODIMENTS

Figure 1:
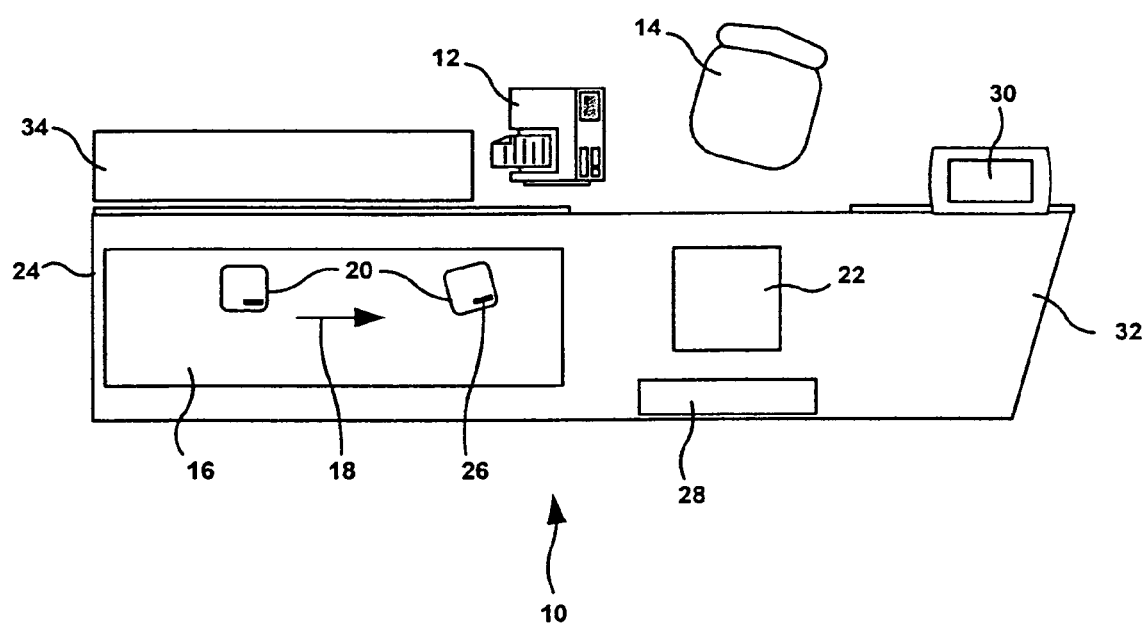
FIG. 1 is a plan view of a point of sale in a retail store or at a sales outlet.

Turning first of all to FIG. 1 there can be seen a plan view of a point of sale, which can for example be one of a plurality of points of sale in a supermarket or retail store, or a single point of sale 10 at a sales outlet.

The reference numeral 12 indicates the usual cash till with a chair 14 where the cashier normally sits. A transport belt 16 running in the direction of the arrow 18 and controlled by the cashier 14 is provided so that the customers can place their purchases 20 on the conveyor belt, e.g. at the position indicated with the reference numeral 16. The purchases can then be conveyed towards the cashier, who either passes them by hand over a barcode scanner 22 built into the table 24 or can use a hand-held scanner (not shown) to read the codes such as 26 (typically barcodes) present on products such as 20 purchased by the customer or key the codes in at the point of sales terminal. The ticket dispenser of the present invention is shown at 30 and is located behind the cashier (when seated normally at the cash till 12) on the cashier's side of the packing area 32 downstream of the scanner 22 where the customer normally takes the products for which he has paid. The reference numeral 34 indicates a promotion shelf positioned on the cashier's side of the table in front of the cash till 12 which may, for example, contain products such as cigarettes or the like. The reference numeral 28 indicates an optional position for a keyboard, scanner and display, as used, for example, in some retail stores.

It will be noted that the position of the ticket dispenser 30 is such that it does not hamper the cashier's work nor does it interfere with the handling of the products purchased by the customer. The position of the ticket dispenser does, however, enable it to be clearly seen by the customer being served at the point of sale and it is also visible to other customers waiting to pay for their purchases in the general area around the cash till.

Figure 2:
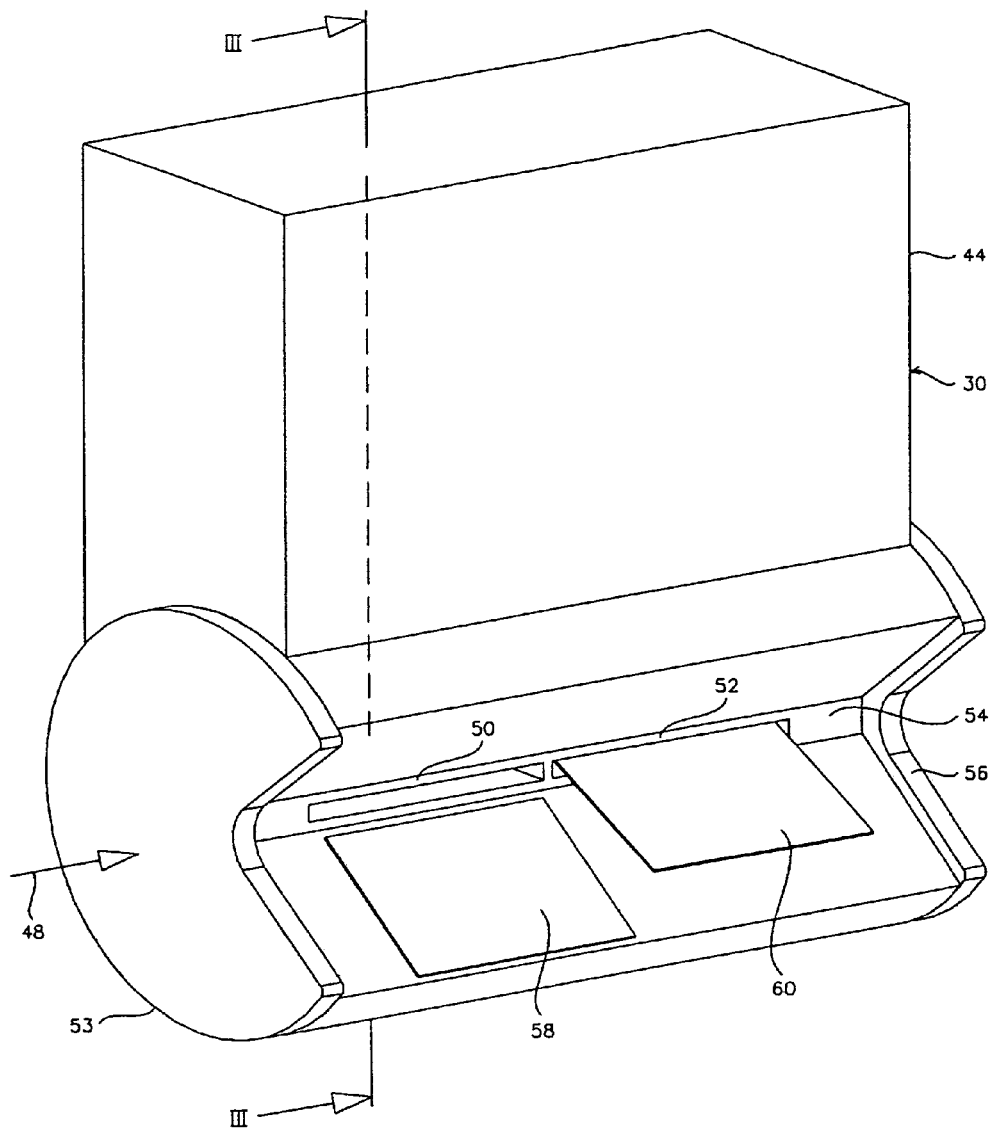
FIG. 2 is a perspective view of a ticket dispenser used at the point of sale in FIG. 1.

Turning now to FIG. 2 there is shown a perspective view of the ticket dispenser 30 in the upright position it normally occupies alongside and just above the packing area 32 in FIG. 1. It can be seen from FIG. 2 that the ticket dispenser 30 has a generally vertically extending housing or structure 44 which serves, in a manner which will be described later, to accommodate advertising displays, and a lower mouth section 53 resembling an open bird's beak in side view, as seen in the direction of the arrow 48, with two dispensing slots 50 and 52 being provided in the throat region 54 of the open mouth 56. The first slot 50 serves to issue a prize ticket 58 associated with a game of chance related to the promotion of a particular product or brand of products or to promotional activity of the related store. The dispensing slot 52 serves to dispense a lottery ticket 60 which has been specifically purchased by the customer as part of his purchases at the cash till. Other dispensing slots and other forms of ticket could also be issued if appropriate, for example further tickets in connection with further promotions or tickets relating solely to a game of chance should the sale of such tickets be permitted. Equally, the apparatus could be reduced to a single dispensing slot 50 if it is intended, for example, only for promotional activities in accordance with the invention.

The specific mechanical design of the dispenser 30 will now be described in more detail with reference to FIGS. 3 and 4, with FIG. 4 being an enlarged view of part of FIG. 3 which better shows some of the fine details.

Figure 3:
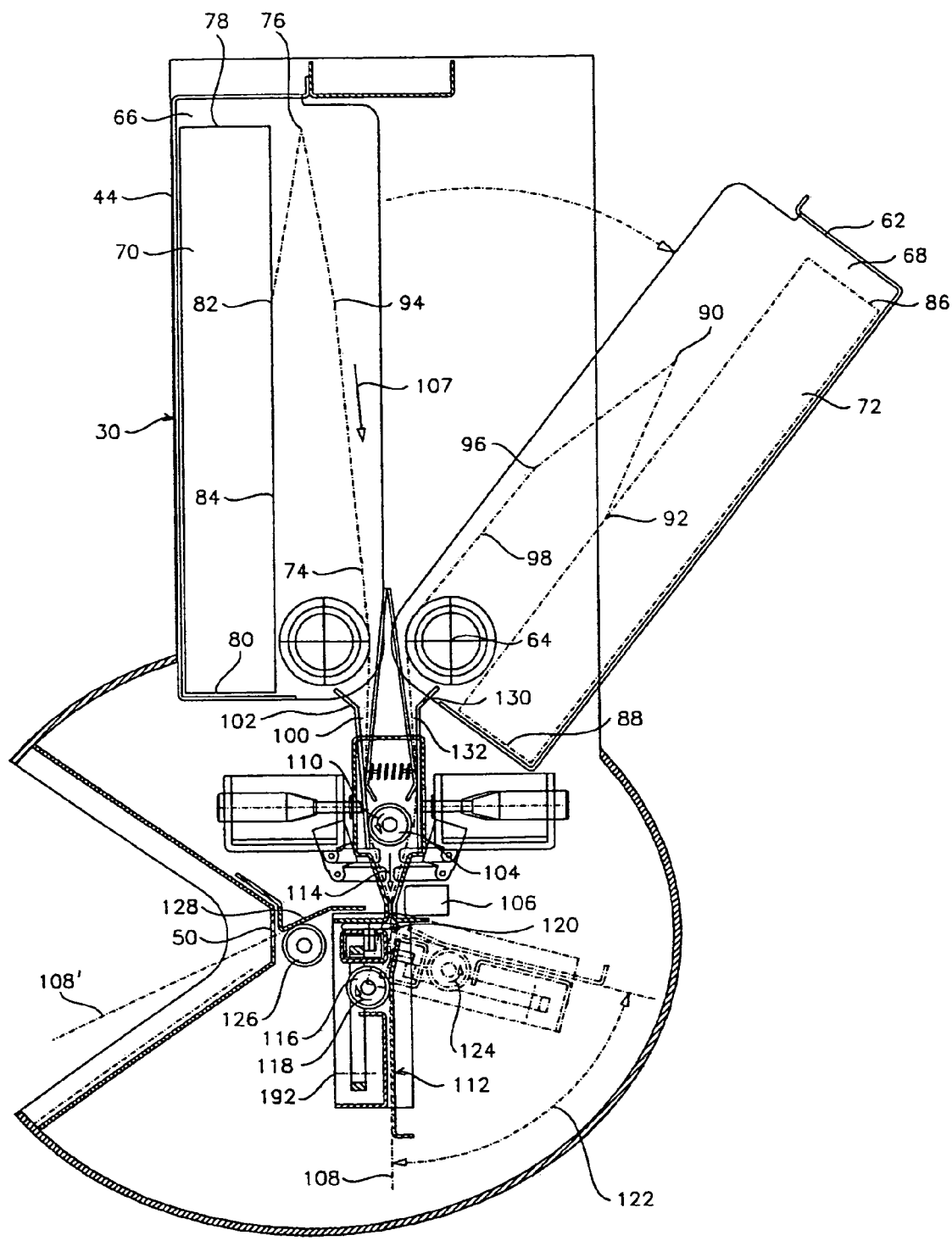
FIG. 3 is a cross-section through the ticket dispenser of FIG. 2 in the plane III-III in FIG. 2.

It can be seen from FIG. 3 that the back portion 62 of the vertical structure 44 can be swung open about a horizontal axis 64 which provides access to two shafts or compartments 66 and 68 one of which, 66, is provided in the fixed part of the housing 44 and the other of which, 68, is provided in the rear openable portion of the housing configured as a door. The shaft 66 accommodates a first pack of tickets 70 in fanfold form and the shaft 68 accommodates a second pack of tickets 72, also in fanfold form. The tickets of the first pack of tickets 70 are in the form of a continuous web of tickets 74 which are folded in concertina-like manner with folds such as 76 at the top end 78 and at the bottom end 80 of the stack. The web of tickets 74 is perforated or otherwise weakened at these positions and, for example, at the positions 82 and 84 in FIG. 3.

The situation with regard to the second pack of tickets 72 is the same, i.e. there are folds at the top and bottom ends 86 and 88 of the stack and perforations at the folds and at intermediate positions 90 and 92. The representation of FIG. 3 also allows perforations to be recognized at points such as 94 on the first web of tickets 74 and 96 on the second web of tickets 98. The tickets of one pack of tickets are all of the same length.

In the diagram of FIG. 3 the first web of tickets 74 has been threaded through a first passage 100 defined between a first wall 102 and one side of a conveyor roll 104 having a rubber jacket. The first roll of tickets 74 continues beyond the rubber roll 104 past a code reader 106 provided for reading a barcode printed on each ticket of the first web of tickets 74. The barcodes are arranged with the bars transverse to the direction of movement 107 of the web of tickets 74 so that the barcode extends along the web of tickets, in which case the reader 106 can be a one dot reader. Should the barcode be printed transverse to the direction of movement 107 the reader 106 must be a linear, optical reading, line sensor. The leading ticket 108 has been fed by rotation of the conveyor roll 104 in the direction of the arrow 110 into a bending mechanism 112 positioned in the drawing of FIG. 3, in the solid-line representation, in line with the general direction of movement 114 of the first roll of tickets 74 through the first passage. The bending mechanism includes a further transport roll 116 which draws in the leading edge of the leading ticket 108 and pulls it fully into the bending mechanism 112 by rotation in the direction 118.

The extent of movement of the roll 116 in the direction 118 is controlled so that the correct length of ticket is drawn in and the perforation between the leading ticket and the next ticket comes to lie at a point shown by the reference numeral 120. This point 120 is in fact an axis of pivoting about which the bending mechanism 112 can pivot to and fro in accordance with the arrow 122, i.e. between the position of the bending mechanism 112 shown in solid lines in FIG. 3 and the position shown in dotted lines, in order to weaken the leading ticket at the line of perforation, or at some other line of weakness, prior to separation of it from the web of tickets 74. The motor for moving the bending mechanism is not shown here for the sake of simplicity. However, its operation is described later in connection with FIG. 6.

Although, in the preferred embodiment, the bending mechanism 112 is pivoted to and fro in the direction of the double arrow 122 just once from the full line position 112 to the broken line position in order to effect adequate weakening of the connection it may do so a number of times to secure fuller weakening of the leading ticket from the web of tickets should the ticket type require this. The preferred method of fracturing the weakened connection will be described later.

Once in the position shown in broken lines in FIG. 3, and assuming the connection of the leading ticket 108 to the web of tickets 74 has been fractured as explained later, the transport roller 116 can then be driven in the opposite direction 124 to feed the leading ticket into a gap between an ejection roller 126 and a wall member 128 of the dispensing mechanism. In this way the ticket is issued through the dispensing slot 50. The diagram of FIG. 3 shows another ticket 108' which has just been issued through the dispensing slot 50.

During the period of dispensing tickets for the first web of tickets 74, the leading ticket 130 of the second web of tickets 98 is stored in a second passage 132 to the right of the conveyor roll 104 in FIG. 3 so that it can be automatically taken into operation once the first web of tickets 74 has run out (or alternately to the ticket web 74 if desired). In the situation shown in FIG. 3 the rear door 62 of the housing has actually just been opened and a new web of tickets 98 has just been inserted so that the leading ticket takes the position 130 shown in FIG. 3. Before operating the ticket dispenser the rear door 62 must first be closed and a micro-switch (not shown in FIG. 3 but at 370 in FIG. 6) must first detect the closing of the door to enable actuation of the ticket dispenser.

It will be noted that the loading position of FIG. 3 is the upright position of the ticket dispenser, i.e. the operating position of the ticket dispenser at the point of sale.

Figure 4:
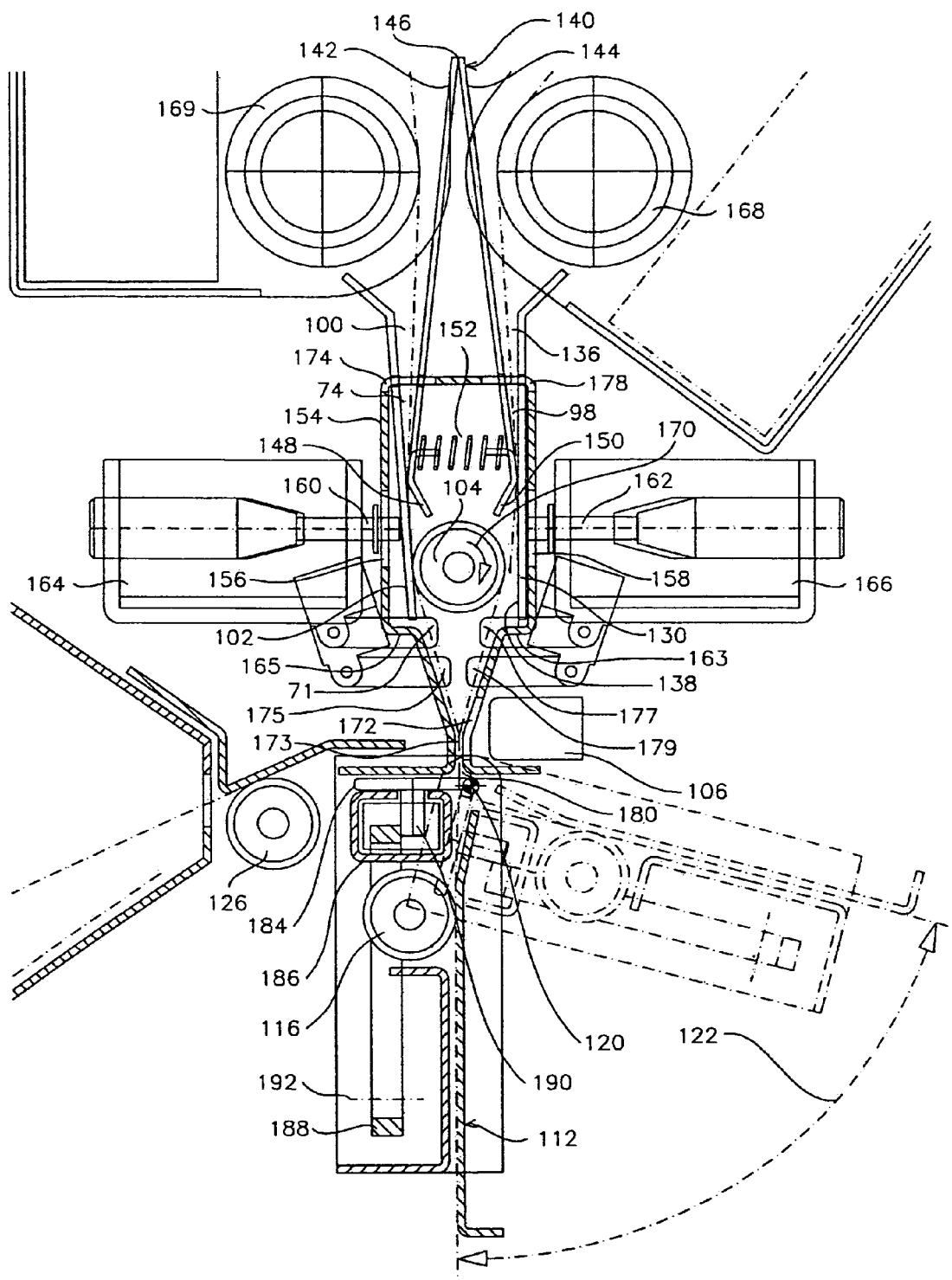
FIG. 4 is an enlarged view of the operating mechanism in the bottom half of FIG. 3.

Turning now to FIG. 4 the detail of the internal mechanism of the ticket dispenser will be explained in more detail.

As already noted the first passage 100 is formed between a first wall 102 and the conveyor roll 104. A further passage 136 is defined between a second wall 138 and the other side of the conveyor roll 104. Between the two walls 102 and 138 there is provided, upstream of the conveyor roll 104, a V-shaped spring-loaded plate arrangement 140 comprising a first plate 142 and a second plate 144 disposed in a downwardly opening inverted V-arrangement and pivoted together at their ends 146. Instead of a pivot 146 the two plates can be simply welded together there or connected in a similar manner and their inherent resilience can be exploited so that they press in the manner shown in FIGS. 3 and 4 against the plate-like wall members 102 and 138 respectively trapping the web of tickets 74 between the first wall member 102 and the angled end 148 of the first plate 142 and trapping the second web of tickets 98 between the second wall member 138 and the angled end 150 of the second plate 144. In the embodiment of FIGS. 3 and 4 the plate members 142 and 144 are hinged together at 146 and a compression coil spring 152 serves to urge them into the clamping positions shown.

It can be seen from FIGS. 3 and 4 that the downstream portions (relative to the direction of conveying movement 107) of the first and second wall members 102 and 138 and the ends of the plates 142 and 144 adjacent the conveyor roll 104 are arranged with the conveyor roll 104 in a housing 154. The housing 154 is generally rectangular in cross-section as seen in FIGS. 3 and 4, with the lower wall of the rectangular housing 154 being formed as a converging V-shaped channel for guiding the tickets of the ticket webs 74 and 98 towards the bending mechanism. Various cut-outs are provided in the walls of the rectangular housing 154. First of all there are cut-outs 156 and 158 arranged opposite to one another in the two sidewalls and these openings permit respective solenoid plungers 160 and 162 to enter into the housing and engage with the wall members 102 and 138 respectively. By energizing the solenoids 164 and 166 associated with the respective plungers 160 and 162, the plungers can be alternately operated so that, in the illustration of FIGS. 3 and 4, the plunger 160 presses the wall member 102 towards the conveyor roll 104, while the plunger 162 is in its retracted position and the wall member 138 lies against the inside of the right-hand wall of the housing 154. The retraction of the plunger is performed by the wall members 102 and 138 activated by spring 152 and the ends of the plates 142 and 144. Alternatively, the retraction of the plunger can, for example, take place by means of a separate spring (not shown) with the advance of the plunger, for example the plunger 160 in the operative position shown in FIGS. 3 and 4, taking place by energization of the solenoid. Alternatively, spring pressure can be used to move the plungers into the operative position, for example as shown for the plunger 160 in FIG. 4, and energization of the respective solenoid can be used to retract the plunger to the inoperative position, for example as shown for the plunger 162 in FIGS. 3 and 4.

It can be seen from FIG. 4 that with the plunger 162 retracted, the leading ticket of the ticket web 98 abuts against the shoulder 163 of the housing and is not in contact with the conveyor roll 104. Accordingly, in the position of FIGS. 3 and 4 only tickets of the web of tickets 74 are conveyed past the barcode reader 106 into the bending mechanism 112. It will also be appreciated that when the operator comes to fit a new pack of tickets, such as 72, into the apparatus the leading ticket is simply pushed into the gap between the wall member 138 and the plate member 144 and downwardly until its leading end comes into abutment with the shoulder 163 of the housing. If necessary, the plate 144 can be pushed by the operator to the left in FIG. 4 to facilitate the entry of the leading edge ticket into this position, with the spring 152 thereby being slightly compressed. Clearly the loading of a new pack of tickets such as 70 into the apparatus takes place in a corresponding manner with the leading ticket butting against the shoulder 165.

The elements 171, 175, 177 and 179 are flag activated, magnetic or optical sensors detecting the edge of an advancing ticket or the presence of a ticket. Elements 171 and 177 detect the ticket edges of the web of tickets 74 and 98 just before these but against the shoulders 163 and 165. Elements 175 and 179 detect the edge advancing downstream of the shoulders 163 and 165.

The element 168 comprises a roller, which could be a driven roller, but which is typically a free-running roller and which helps the operator fitting a new pack of tickets to ease the leading ticket into the gap between the plate member 144 and the wall member 130 and into the passage between the wall member 130 and the conveyor roller 104 until its leading edge abuts against the shoulder 163 of the housing. The description for the roller 168 also applies to the roller 169 associated with the web of tickets 74.

In operation, once the web of tickets 74 has been used up, which is recognized by the apparatus from the flag sensors 171, 175, 177 and 179, the electronic control will cause the plunger 160 to be released so that it moves to the left in FIG. 4 and will energize the solenoid 166, and cause the plunger 162 to also move to the left, so that the wall means 130 now presses the leading edge of the ticket against the conveyor roller 104. At the same time the motor driving the conveyor roll 104 is instructed to change its direction of rotation from the direction of rotation 110 in FIG. 3 to the direction of rotation 170 in FIG. 4 so that it is now able to convey the ticket web 98, and in particular the leading ticket, into the outlet mouth 173 of the convergent outlet channel of the housing 154 and past the code reader 106 which now reads the code present on the second web of tickets 98. Because the first roll of tickets 74 and the second roll of tickets 98 are arranged facing one another in the housing the barcode is always printed on the side of the ticket facing the reader 106, so that only a single reader is required, and indeed the reader 106 is able to view the tickets through the opening 172 provided in the wall of the housing.

In addition to the openings 156, 158 and 172 in the housing, and openings for the flags 171, 175, 177 and 179, there are two further openings 174 and 178 providing access for the webs of tickets 74 and 98 and for the respectively associated portions of the first wall member 102 and the plate 142 and of the second wall member 130 and the second plate 144. In the preferred embodiment the motor used to drive the rollers 104 is preferably an electronically controlled motor, such as a stepping motor, and the motors used to drive the rollers 126 and 116 are DC motors controlled by end switches (as will later be described with reference to FIG. 6). They could, however, also be electronically controlled motors, such as stepping motors. The roller 104 controls the advance of the web of tickets and overrides the soft driven roller 116. Roller 126 can be driven by a separate motor or with a belt from roller 116. In either case the extent of rotational movement can be readily matched to the length of ticket to be transported. The motors driving the rollers 104, 126 and 116 which are not shown in FIGS. 3 and 4 are thus connected to the electronic control.

The preferred bending procedure for weakening the connection of the leading ticket to the web of tickets will now be described. For the purpose of this description it should first be assumed that the free end of the leading ticket is transported by roller 104 to sit precisely adjacent the axis of rotation of the bending mechanism 120. This is achieved by the electronically controlled motor, such as a stepping motor, and the starting position of the leading edge of the ticket when passing over the flag sensors 175 (179 for the second web). The ticket from the relevant ticket web, e.g. 74, is first transported forward by rotation of the conveyor roll 104, in the case of this example in the arrow direction 110, and subsequently by the transport roll 116 until the perforation joining the leading ticket to the remainder of the web is positioned some millimeters outside of the bezel 180, i.e. the exit end of the outlet mouth 173. This extent of movement is determined by the electronic control for the conveyor roll 104 and/or for the transport roll 116. Thereafter the bending mechanism 112 bends the ticket about the axis 120 by a single, anticlockwise movement in the direction of the arrow 122. Thereafter the conveyor roll 104 is rotated in the opposite direction (170 in FIG. 4) to pull the ticket web back until the bent edge, i.e. the bend at the line of perforations, stops at a bezel 180 where, due to the stiffness of the ticket material, the web 74 cannot be pulled back further. The conveyor roll 104 is then reversed again and positions the web forward until the bent edge is placed at the position of a separator wheel 184. This sequence of return movement and repeated forwarded movement allows a precise detection of the position of the perforation and synchronizes the perforated edge, i.e. the leading edge of each ticket, so that it always comes to rest at the same position and is ready for the next ticket feeding operation.

The ticket handling operation is now continued in that the bending mechanism 112 is moved back, i.e. from the dotted-line position back to the solid-line position in the opposite direction of the arrow 122, which further weakens the perforation. In order to actually separate the leading ticket 108 from the web of tickets 74 at the perforation, the blunt separator wheel 184, which is mounted on a translatable carriage 186 driven by a belt 188, is caused to move along the perforation while rotating about the axis 190 (as a result of friction of contact with the web of tickets) and in so doing breaks up the perforation. The belt 188 is formed as an endless belt and is driven to and fro by a motor which rotates a drive wheel about the axis 192 in FIGS. 3 and 4 (motor not shown).The amplitude of the to and fro movement of the endless belt is sufficient to ensure that the blunt separator wheel moves fully across the width of the web of tickets and thus separates the leading ticket from the web of tickets at the perforation. During this movement of the wheel, the web is clamped between the conveyor roll 104 and the wall means 102 and the leading ticket 108 is clamped between the transport roll 116 and the oppositely disposed plate of the bending mechanism. Accordingly, the pressure exerted by the separator wheel as it runs onto the web 74 from the side pushes the web transverse to the conveying direction 114 thus stretching it and breaking it at the weakened perforation. The use of a wheel to break a web of tickets is known per se, e.g. from U.S. Pat. Nos. 4,982,337 and 5,836,498. Once the ticket has been separated, the bending mechanism is rotated again in the direction of the arrow 122 in the anticlockwise direction to the dotted-line position and the transport roll 116 is rotated in the direction of the arrow 124 to move the ticket towards the ejection roller 126 and into the gap between the ejection roller 126 and the wall member 128, for subsequent issue through the dispensing slot 50. Thereafter, the bending mechanism 122 is returned in the opposite direction to the arrow 122 to the solid-line position and is ready to receive the next ticket.

While the description of FIGS. 3 and 4 has been made with respect to two packs of fanfold tickets which are issued through the mouth 50, it will be appreciated that other, adjacent, shafts containing packs of fanfold tickets can be arranged in series, i.e. behind or in front of the ticket dispenser in the plane of the drawing shown in FIGS. 3 and 4, for example to issue tickets through the dispensing slot 52 in FIG. 2. One possibility is for the tickets to be issued through the slots 52 to be lottery tickets which are purchased by the customer at the relevant point of sale, with the number of lottery tickets purchased by the customer being issued in sequence through the dispensing slot 52. If lottery tickets are issued then one ticket is issued for each ticket purchased, i.e. not just winning tickets. The lottery tickets will be supplied by a lottery company in the usual manner with the usual security applied. The only difference with respect to normal lottery tickets is that the barcodes must be applied as described for the winning tickets such as 74, so that they can be read by the barcode reader 106.

It is a particular advantage of the design shown here that any number of ticket dispensing slots can be provided alongside one another, with the ticket dispenser simply becoming wider, i.e. in the direction of the conveyor belt at the point of sale. It is particularly convenient that the same conveyor roll can be used as a common conveyor roll for all ticket shafts or compartments, since the driving of a ticket in the one or other direction only takes place when the associated solenoid presses the relevant wall means towards the conveyor roll trapping the relevant ticket web between the movable wall and the conveyor roll. Thus, it can be ensured that only the desired ticket from the desired ticket web is driven, simply by energizing only the solenoid plunger associated with the particular ticket web involved. Although the conveyor roll also runs at all other shafts the fact that the plungers there are deenergized means that no ticket transport will take place.

Figure 5:
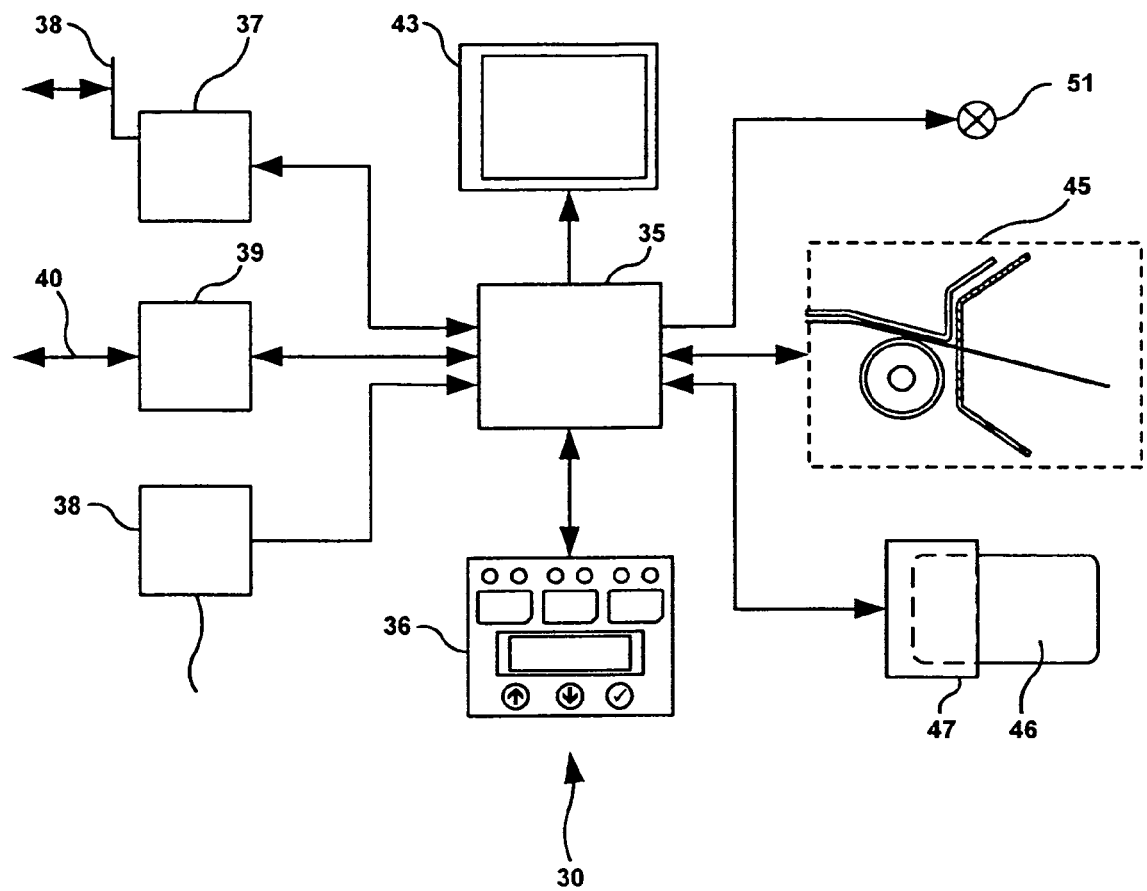
FIG. 5 is a block diagram illustrating the main blocks of the ticket dispenser.

FIG. 5 shows a block diagram of a ticket dispenser 30 showing the electronic blocks and symbolically the mechanism in one block labeled 45. The embedded controller 35 drives the motors and solenoids and senses the signals from the sensors of the ticket dispenser mechanism 45. The operator control panel 36, which is only accessible when the back portion 62 (and/or front portion, not shown) ticket dispenser 30 is opened, holds the SIM chipcards for the ticket webs, and includes indication lights, a display and some keys to maneuver the display menu and prompt commands at the display, details of which will be explained with reference to FIG. 6. Power for the electronic and electromechanical equipment is provided by power supply 38. A data network connection module 39 is linked to 100/10 BaseT Ethernet 40, and a wireless module 37, such as one following the Bluetooth standard, communicates via aerial 38 with a wireless access point of the site network as will be described in connection with FIGS. 12 and 13. An optional electronic promotion display 43, a player chipcard 46 with reader 47 and indicator lights 44 are also connected to the embedded controller 35.

Figure 6:
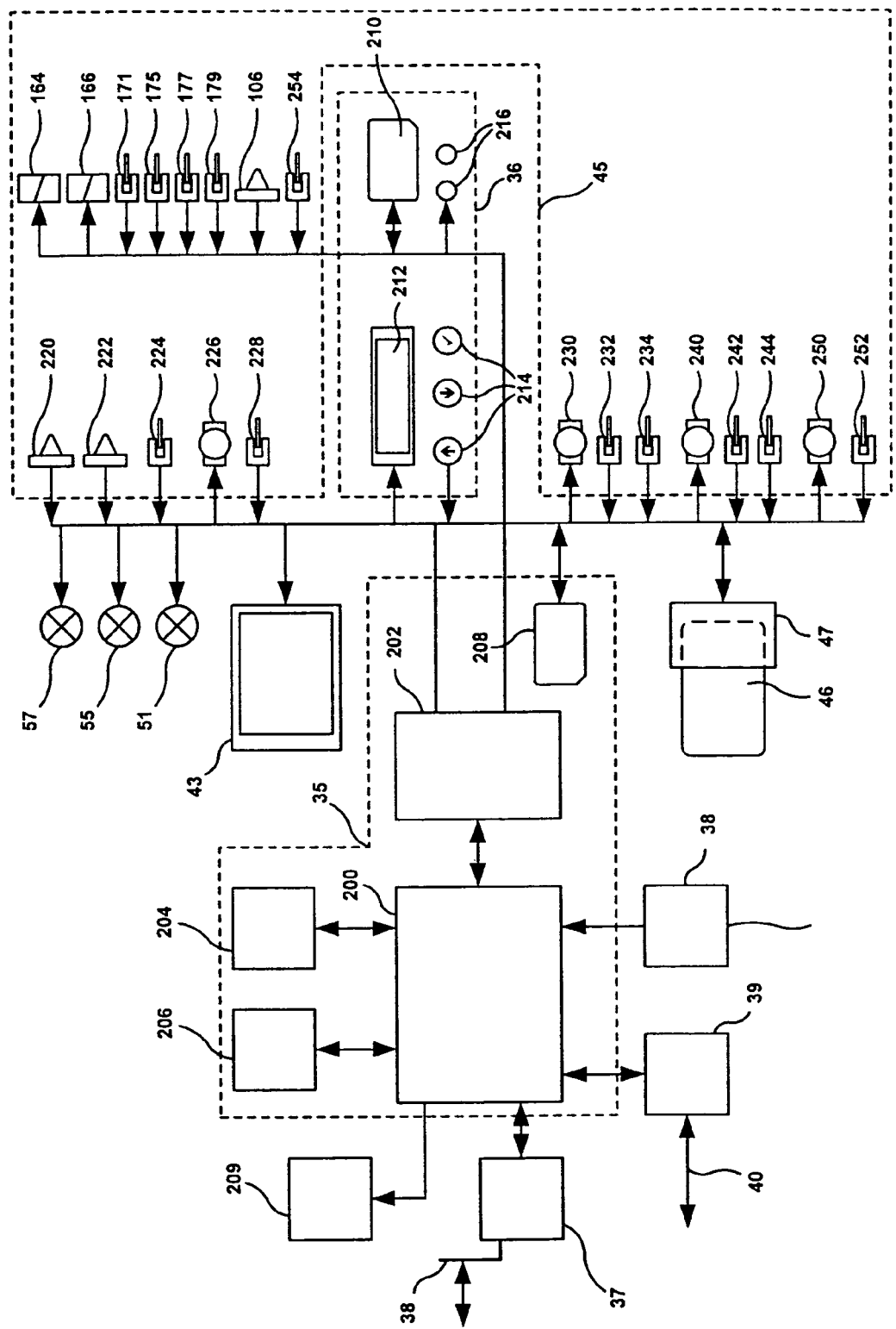
FIG. 6 is a block circuit diagram to explain the electronic control of the operation of the ticket dispenser configured in accordance with the present invention.

Turning now to FIG. 6 there can be seen a block circuit diagram of the electronic control for the ticket dispenser 30.

Reference number 35 designates the embedded controller which is preferably composed of a embedded controller 35 with a Flash ROM 206 and a RAM 204 incorporated into the ticket dispenser. A peripheral expander 202 increases the number of inputs, outputs and serial connections to suit the peripheral requirements and the unit-SIM 208 chipcard contains the identity of the controller 35 and serves as a secure access module SAM for the player card 46 and the ticket-SIM cards 210.

As shown already in FIG. 5 the embedded controller is connected to a wireless module 37 with aerial 38, a data network connection module 39, a power supply 38, the optional display 43, preferably a flat panel display, for promotional and prize information and indicator lights 51, 55, 57 which light up to indicate e.g. a game of chance for a promotional ticket prize.

The operator control panel 36 can be used when an operator is servicing the apparatus to check if all items are functioning correctly and to check if the dispenser 30 holds the ticket-SIM chipcards 210. The indication lights 216, one per dispensing position, serve to indicate a required refill and the proper position of a newly loaded ticket strip. A small alphanumeric display 212 serves to display messages for the operator and a few keys 214 will enable the operator to maneuver the display menu and prompt commands at the display. The ticket-SIM chipcards 210 correspond to the ticket types in the dispensing positions and store information relating to the ticket type identity and the game parameters or algorithms for deciding whether or not a promotion ticket is issued after a purchase in a point of sales application, or when a ticket is purchased for the ticket game, which will be described later.

The ticket-SIM microchip card is delivered with the games and also carries information concerning the authentic numbers of tickets supplied for the prize bonus game, the nominal value and authentic number range of lottery tickets provided for the playing of a lottery game, and the game algorithm or its identity necessary for the playing of the prize bonus game.

The reference numerals 220 and 222 represent the electronic detectors, such as barcode readers, associated with the vertically extending structure 44 of the ticket dispenser. If the front surface of the vertically extending structure of the ticket dispenser 44 is adapted to receive transparencies indicating a particular product or brand being promoted, or promotion relating to the store itself, then it is preferred for the transparency to carry an identification of some kind, for example a wide barcode, which can always be positioned at the same place on the transparency, so that it sits in front of a wide-barcode reader 220 incorporated into the ticket dispenser 30, whereby the transparency can be identified. The signals of the code readers are transferred to the embedded controller 35 via the peripheral expander 202.

Figure 15:
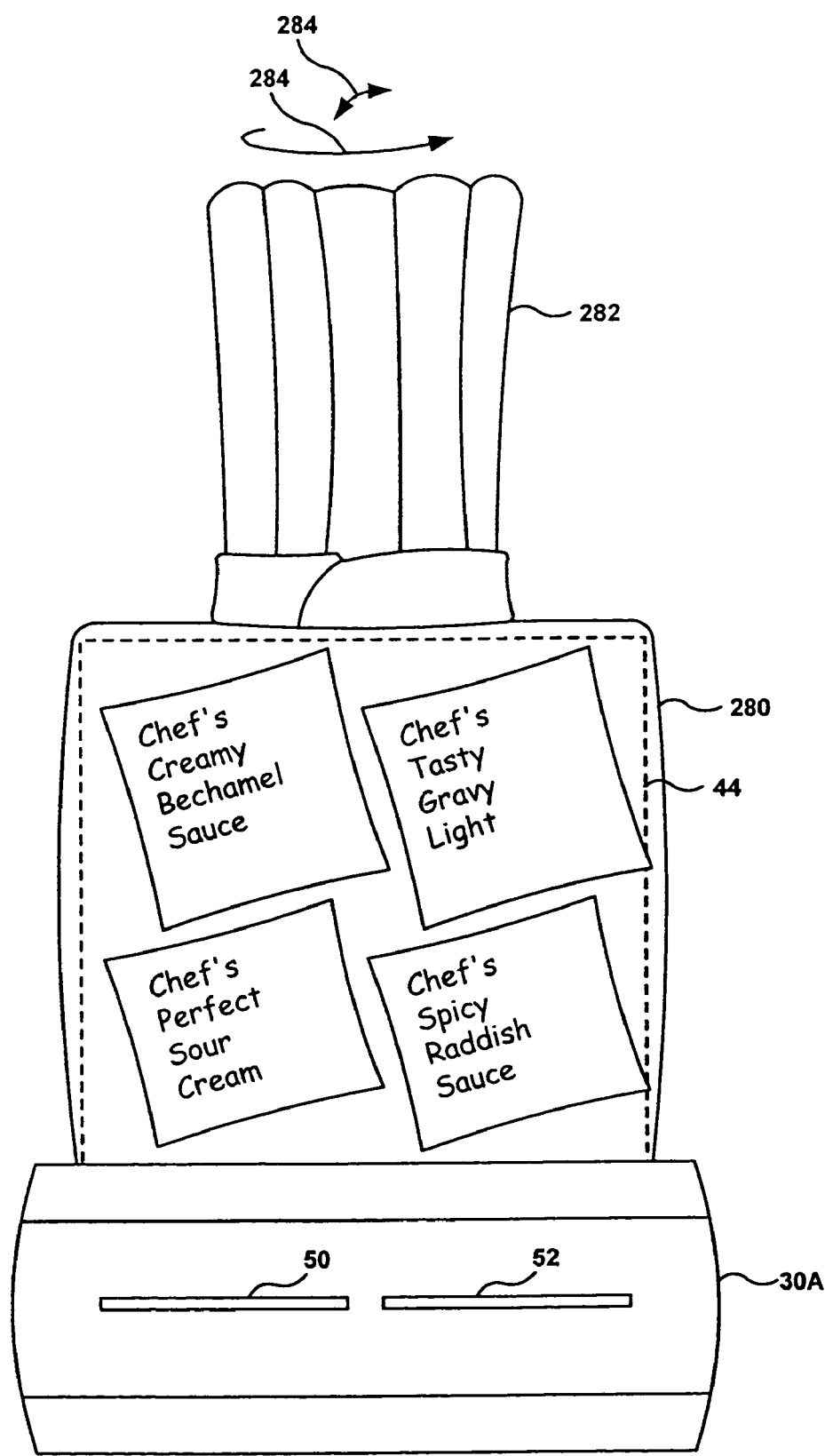
FIG. 15 shows an example of a ticket dispenser configured as an advertisement at a point of sale.

In the same way, if the vertically extending structure 44 of the ticket dispenser 30 is adapted to receive different sculptures, hoods or masks 280 in FIG. 15, then a wide barcode will normally be positioned at a strategic location on the sculpture, hood or mask and will be read by a suitable barcode reader 222. It is possible to use the same barcode reader (220 or 222) for both transparencies and sculptures, thus eliminating one barcode reader and minimizing the cost of the ticket dispenser. Various other items associated with the ticket dispenser are shown attached to the peripheral expander 202. For example the ticket dispenser 30 is preferably provided with an arrangement of LED lights 51 which can be illuminated in any desired pattern or sequence under control of the embedded controller 35 to highlight a transparency or mask, sculpture or hood mounted on the vertically extending structure 44 of the ticket dispenser. In addition, the ticket dispenser is preferably provided with lights 53 which flash when a game is under way or when a game has been won. These lights 51 and 55 are again controlled from the embedded controller 35. Moreover, the dispensing slots 50 and 52 are preferably provided with special lighting, for example in the form of a transparent, back-lit bezel, and the respective lights 57 are again controlled from the embedded controller 35.

Figure 11:
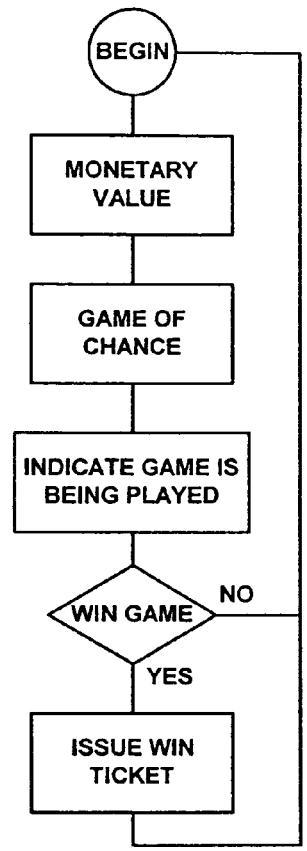
FIG. 11 is a block circuit diagram showing the principle of operation of a ticket dispenser when configured as a gaming unit.

If the ticket dispenser 30 is configured as part of a gaming device as described with reference to FIGS. 11 and 14, then it is conveniently provided with a card slot 47 into which a player chipcard 46 can be inserted. The player chipcard 46 would normally be a card of the preloaded type, i.e. one where the player can pay a certain amount of money into a machine which then electronically stores the amount of money on his player chipcard. With this system the embedded controller 35 then deducts a certain amount of the stored sum on the chipcard for each game played. Once the player has inserted his player chipcard he activates a handle 224, or another means, such as a button, in order to initiate one game or, especially with the type of handle of FIG. 14, a sequence of games. Instead of a card slot 47 the ticket dispenser can be loaded remotely with monetary value as described with reference to FIG. 13 and/or fitted with a coin or token receiving system so that it can be played by inserting coins or tokens rather than a player chipcard.

Once a game is under way, either because the unit is configured as a gaming machine and someone is playing it, or because it is installed at the point of sale and a game has been triggered via the point of sales terminal, then various sound effects and lighting effects can be triggered by the embedded controller 35 as indicated by the reference numerals 209 for sound and 44 for light.

The embedded controller 35 controls the motor 226 which drives the conveyor roll 104. It also controls the motor 230 which drives the bending mechanism 112 to move in the direction of the arrow 122. In order to be able to conveniently reverse the direction of rotation, sensors are provided in the ticket dispenser which sense the end positions of the bending movement, i.e. the solid-line position and the dotted-line position in FIGS. 3 and 4. These end sensors are identified in FIG. 6 by the reference numerals 232 and 234 and can for example be formed as microswitches or as inductive proximity sensors. Reference numeral 240 identifies the motor which drives the separating wheel 184 to move to and fro across the ticket web to separate it at the perforation. The reversal of this motor is again triggered by end sensors, identified here with the reference numerals 242 and 244 which, as in the case of the sensors 232, 234 for the motor 230 for the bending mechanism, can be formed as microswitches or proximity sensors.

Reference numeral 250 identifies the motor which drives the ticket ejection roller 116 and, via a belt arrangement, the roller 126. No end stop is necessary here because when ejecting tickets the roller 116 on the bender 112 and the ticket ejection roller 126 just run sufficiently long to completely eject the ticket. The sensor 252 is to check if the motor 250 is jammed.

Reference numeral 228 indicates a sensor by which the embedded controller 35 checks if the ticket dispenser 30 is locked, i.e. if the housing 44 is closed and locked.

The reference numerals 164 and 166 designate here, as in FIGS. 3 and 4, the solenoids which are used to determine which of the ticket webs is pressed into engagement with the conveyor roll 104. The sensors 171, 175, 177 and 179 are the flag sensors for the edge and the presence of the ticket webs. Again, the sensors can be formed as proximity sensors. Reference numeral 106 designates the barcode reader previously described with reference to FIGS. 3 and 4.

Finally, the reference numeral 254 designates sensors which enable a check to be made whether the storekeeper or operator has correctly closed the back portion 62 (and/or front portion) of the housing 44, which can only be taken into use once it has been loaded and the housing closed.

Figure 12:
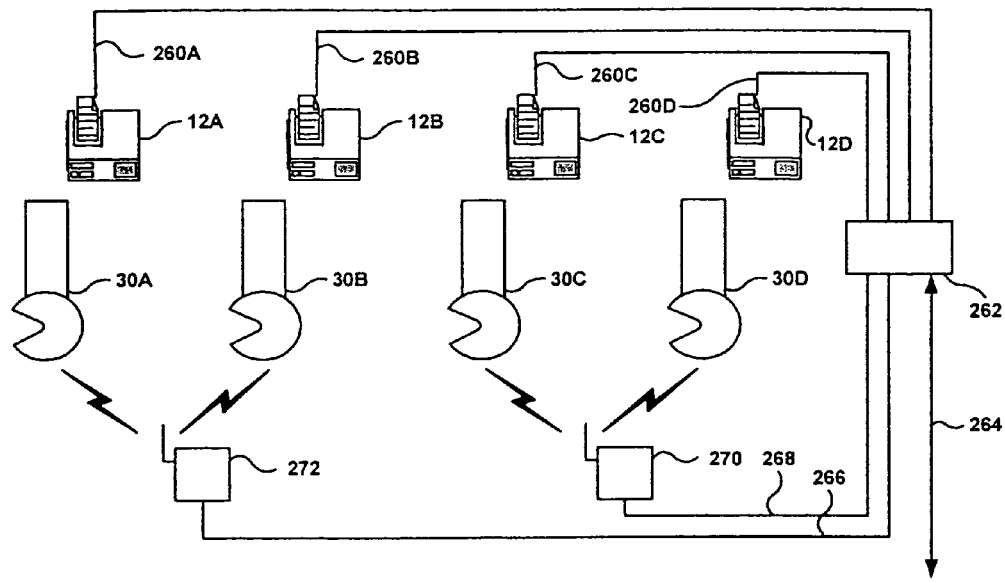
FIG. 12 is a diagram showing a basic layout for providing electronic access to four ticket dispensers at four points of sale, for example in a retail store having four cash tills.

Turning now to FIG. 12 there can now be seen the general electronic lay-out for four ticket dispensers 30A, 30B, 30C and 30D provided at the four point of sale terminals illustrated by their respective cash tills 12A, 12B, 12C and 12D. The computer present in each cash till 12A–12D is connected via a respective data network 260A, 260B, 260C, 260D to a switch/router 262 which is connected to a host computer (not shown) via a further data network link 264 of a wide area network. Attached to the switch/router are the radio access points 270 and 272 whereby radio access point 270 also operates as a server which accesses the data transferred from the cash tills to the switch/router in accordance with a program stored in the server and related to the promotional activity which is taking place. Thus, by way of example, if a particular product is being promoted, then the server 270 can check the signals transferred to the switch/router via the data networks 260A–260D to see whenever the barcode relating to the product being promoted appears. It can then trigger the relevant ticket dispenser 30A–30D to initiate the advertising associated with the product and to issue a ticket.

In order to avoid unnecessary wiring the communication from the server 270 to the respective ticket dispenser 30A–30D takes place via a corresponding short range radio link. For this purpose two such short range radio links between the radio access points 270 and 272 and the ticket dispensers 30A–30D are provided in the FIG. 12 embodiment, each radio link communicating with two adjacently disposed ticket dispensers 30A and 30B and 30C and 30D respectively. Each pair of associated ticket dispensers, such as 30A and 30B, is arranged at two adjacent points of sale 10. By coding the transmissions it is possible for the server 270 to ensure that the signals transmitted by the respective radio link 270, 272 are transmitted to the unique ticket dispenser for which the communication is intended.

The radio access points 270 and 272 are connected via respective data networks 266 and 268 to the switch/router 202. In addition to the radio links transmitting information to the ticket dispensers 30A–30D, the ticket dispensers have an electronic computer therein, an embedded controller (35 FIG. 5), which is able to transmit messages back by the radio modules (37 FIG. 5) via the radio links to the radio access points 270 and 272 respectively, so that a two-way communication is possible to the ticket dispensers 30A and 30D and from the ticket dispensers to the server 270.

In this way the ticket dispensers 30A–30D can communicate to the server 270 information such as the presence of a correct or incorrect pack of tickets, the issue of a winning ticket, validity data relating to each ticket of the pack of tickets, identified by its barcode via the barcode reader 106, the running out of one of the two packs provided for each dispensing unit and, if provided, information on the presence of the correct advertising transparency, mask, sculpture or hood present on the ticket dispenser. Information can also be transmitted confirming the operational status of all motors and drives in the ticket dispensers. This information is stored in memory provided typically in the server 270 and externally accessible either via the wide area network or via a radio modem associated with the server 270. This accessing of the data downloaded from the ticket dispensers 30A–30D can take place automatically and regularly from a company entrusted with controlling the advertising and/or servicing of the ticket dispensers.

If multi-media displays are used in addition to the advertising at the ticket dispensers then these can be connected to the wide area network and accessed via the server 270 whenever a particular piece of promotion has to be run on one or more of the multi-media units.

The ticket dispensers 30A–30D contain within their housing the ticket-SIM chipcards 210 which correspond to the ticket types in the dispensing positions. Each chip has stored on it all the information relevant to the game of chance being played and the identity of the packs of tickets which can be used within the dispenser. Since this chip, which resembles a telephone card microchip, such as is used in a cell phone, is either supplied with every pack of tickets or at least with every pack of a new type of tickets it is always up to date. Should someone try to use a new pack of tickets with an old chipcard, or vice versa, then the identity verification will show that there is a fault and tell the operator what he has to do to remedy the fault.

If the ticket dispensers 30A and 30D are for example laid out to issue lottery tickets in addition to the winning tickets associated with the game of chance connected to the promotional activity, then the customer at the point of sale has to purchase the lottery ticket by placing a teaser on the transport belt 16. This purchase results in an input to the system, either via a barcode scanner scanning the teaser meant to initiate the sale of a lottery ticket, or by the cashier pressing the appropriate lottery sale button. The information is extracted from the relevant cash till via the switch/router 262 by the server 270 and used to trigger the ticket dispenser to issue the relevant lottery ticket.

Figure 13:
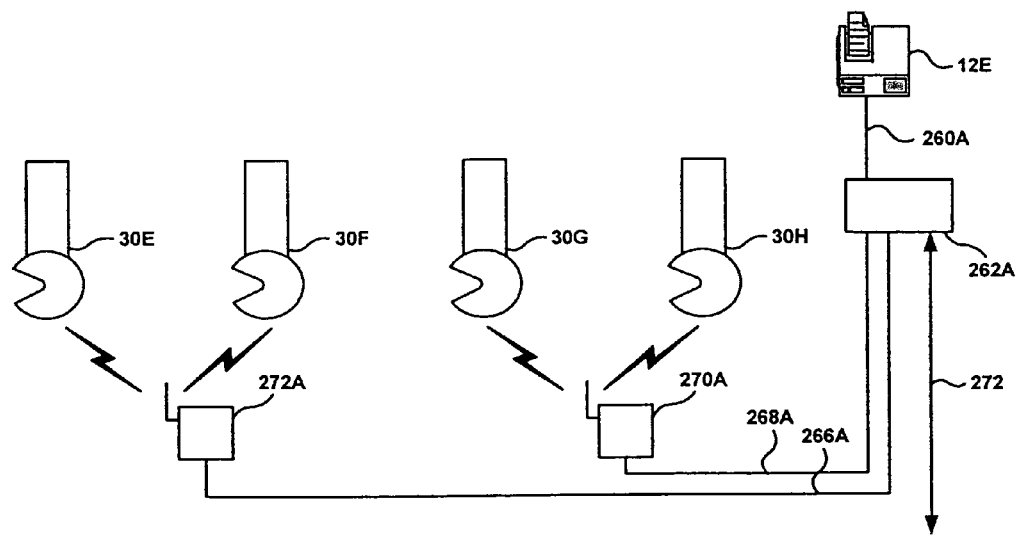
FIG. 13 is a diagram showing a layout for accessing four ticket dispensers in a public house or gaming parlor which are adapted to dispense lottery tickets and/or gaming tickets.

FIG. 13 shows a situation similar to that of FIG. 12 but now showing four ticket dispensers 30E, 30F, 30G and 30H configured as gaming machines and installed for example in a bar or saloon. The ticket dispensing units 30E–30H shown in this case are much lower in cost than the usual gaming machine and because of that they can be played with low stakes economically. Each ticket dispensing unit is also much smaller than a conventional gaming machine so that it can be placed on counters and tables, for example disguised as a beer tap as schematically shown in FIG. 14. In order to play the machine, the patron of the bar or saloon can for example purchase a number of authorizations at a cash till 12E present in the bar or saloon. The communication between such a cash till and the relevant ticket dispenser 30E–30H takes place in the FIG. 13 embodiment in much the same way as in the FIG. 12 embodiment. In this case, however, there is just a single data network 260A to a switch/router 262A. A server 270A is again connected to the switch/router via a respective data network, and two further data networks 266A and 268A to two short range radio links between the radio access points 270A and 272A and the ticket dispensers 30E–30H are provided. Again, there is a connection to the host computer (not shown) by a telephone dial-up link 272 or by radio from a GSM module in server 270A respectively.

Instead of the patron having to buy his gaming authorization via the point of sale 12E, the ticket dispenser 30E–30H could also be equipped with a coin slot or a slot for receiving a reloadable chipcard which can be loaded up to a certain monetary sum for the player to use at the gaming machine (see also FIG. 6).

In this case the ticket dispensers contain in their embedded controller 35 a gaming program which can, for example, take the following simple form.

First of all the program contains a table in which a number of winning numbers is stored, a so-called win table. This can, for example, simply be the numbers 1 to 100. Also contained in the embedded controller 135 or preferably in the ticket SIM chipcard 210 is a program which operates as a random number generator. Each time the gaming unit is activated, for example by a simple trigger input by the user pressing a button (assuming the user has paid money into the unit to start the game), the random number generating program will generate a random number within a certain range, say 1 to 500. Whenever the number generated by the random number generator is equal to one of the winning numbers, the game has been won and the ticket dispenser is activated to issue a winning ticket to the player. The magnitude of the win is recorded on the winning ticket. Thus a pack of winning tickets can be provided, for example in a random or pseudo-random manner, with a variety of wins, and the order in which the tickets are issued determines which win the player receives next.

The flow diagrams of FIG. 7 to FIG. 11 show the different operation modes of the ticket dispenser.

Figure 7:
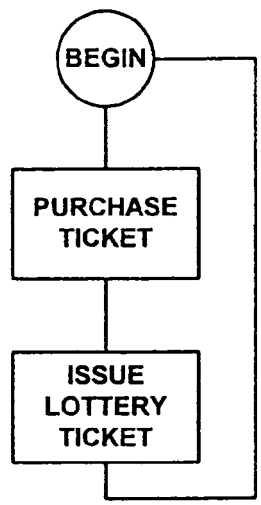
FIG. 7 is a flow diagram showing the principle of operation of a ticket dispenser in accordance with the present invention.

FIG. 7 shows the flow diagram of a purchase of a lottery ticket against payment at the point of sales terminal.

Figure 8:
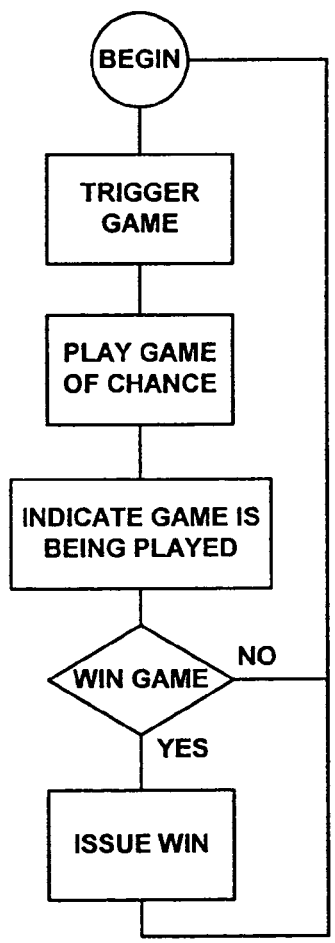
FIG. 8 is a flow diagram showing the principle of operation of a ticket dispenser when configured to perform a game of chance before issuing a ticket.

FIG. 8 shows the flow diagram of the principle of the ticket dispenser holding only win tickets and at which the game of chance is performed by a computer.

Figure 9:
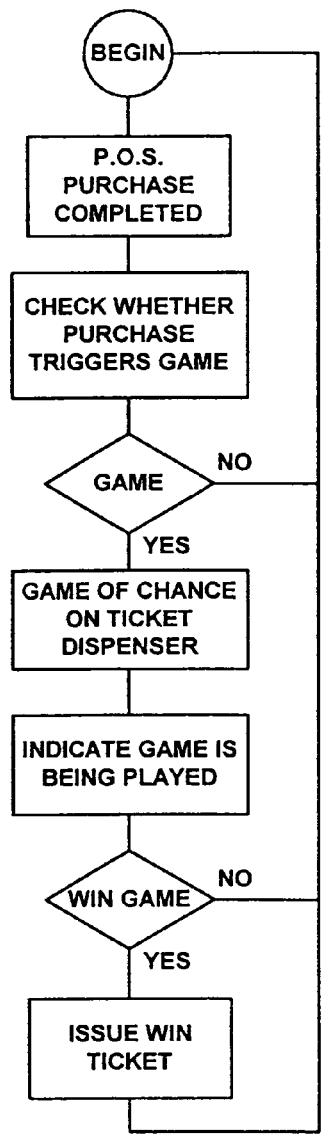
FIG. 9 is a flow diagram showing the principle of operation of a ticket dispenser when configured for post point of sales promotion.

FIG. 9 is the flow diagram of a point of sales prize promotion in a retail store.

Figure 10:
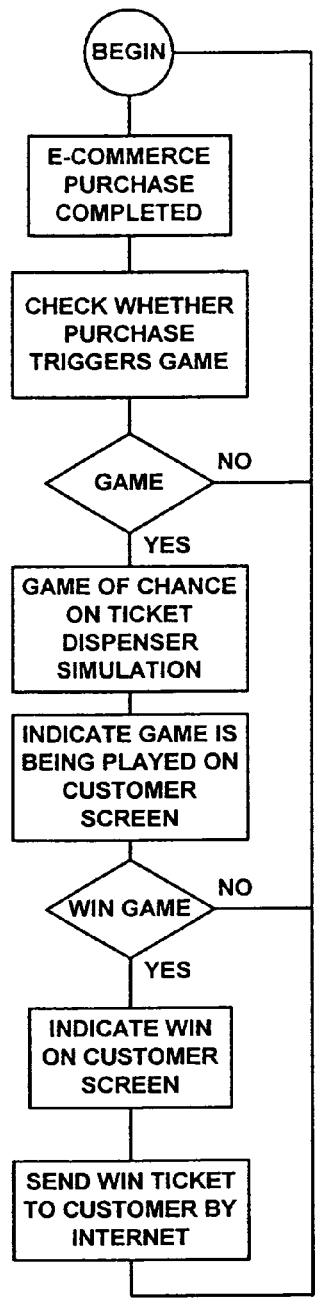
FIG. 10 is a flow diagram showing the principle of operation of a virtual ticket dispenser when configured for post cashier point promotion in e-commerce.

FIG. 10 is the flow diagram of a e-commerce prize promotion.

FIG. 10 is the flow diagram of a ticket dispenser configured as a gaming device.

Figure 14:
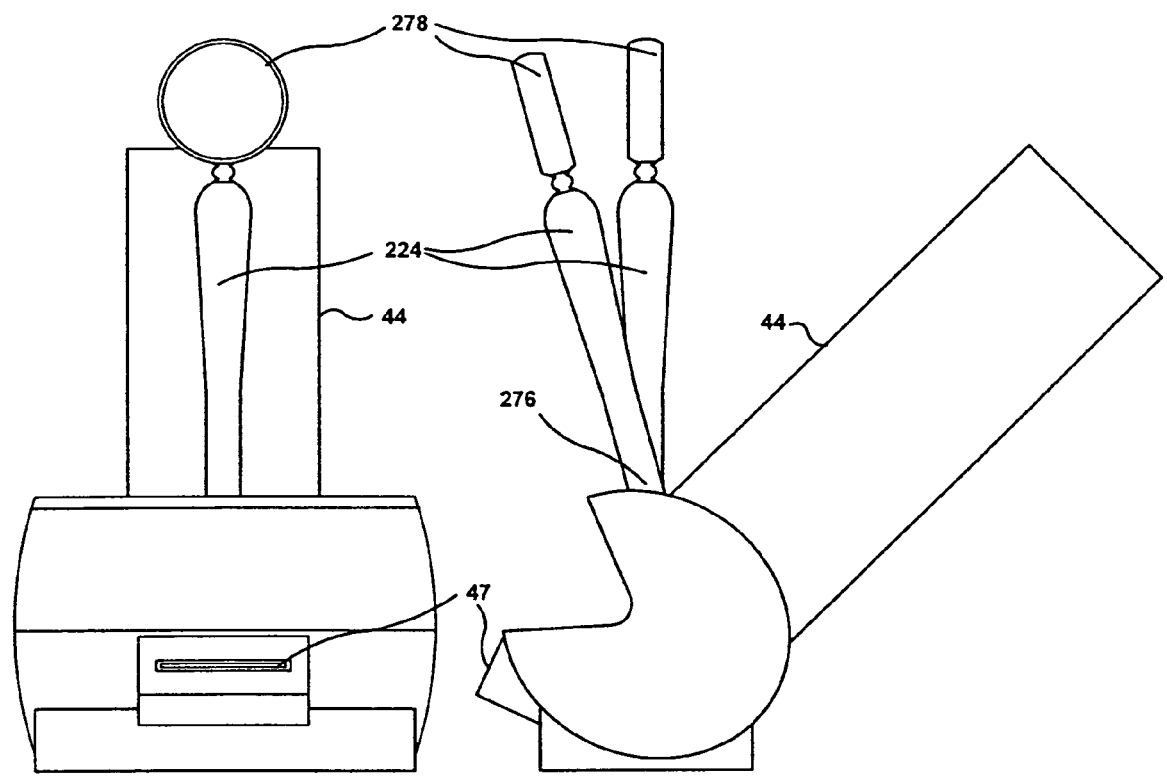
FIG. 14 shows an example of a ticket dispenser configured as a gaming machine in a public house or bar.

FIG. 14 shows a ticket dispenser 30E configured as a gaming machine and simultaneously as an advertisement for beer. It resembles a beer tap as used in traditional public houses (bars) in England and has a handle 224 resembling the handle used by a barman to pull a pint of beer. The handle has a pivot joint 276 resembling that of the conventional beer tap but operated here by a player and a top disk 278 to be used for advertisement. Operation of the handle, which could take place towards the player rather than towards the barman—as is the case with a conventional tap—can be used to trigger each game. The numeral 44 indicates the shaft holding the ticket packets and providing advertising surfaces, and 47 represents the player card slot as in FIG. 5.

FIG. 15 shows a ticket dispenser 30A carrying a sculpture 280 with a cook's hat 282, which could also be a hood or mask, and is designed to advertise sauce products from the Chef company. The sculpture is placed over the vertically extending structure 44 of the ticket dispenser. To add effect the cook's hat 282 could, for example, nod in accordance with the arrow 284 or turn as indicated by arrow 286.

The operation of the apparatus in various modes and configurations will now be summarized for the sake of completeness.

As mentioned above, the ticket dispenser units can basically be realized in at least three versions which can, if desired, be combined into one apparatus.

In a first version the ticket dispenser is used for the dispensing of scratch lottery tickets in the point of sale area after these tickets have been registered at the point of sale terminal, either by passing a teaser along the scanner or registering the ticket purchase directly into the point of sale terminal.

In a second version the ticket dispenser can be used, in addition to dispensing scratch tickets, for the functions of promotion by display- and sculpture-based advertising, prize-and-bonus-competitions with prizes and bonus scratch tickets dispensed/spit-out on the spot, triggered by specific or any purchase, winning chance flat or purchase/time dependent, optional wide area progressive jackpot prizes with real-time progressive jackpot value indication, notebook-style advertising display networked with chain-wide real-time updates, happy hours with fixed time schedules and/or spontaneous promotion timespans.

In a third version the ticket dispenser is used as a gaming device/machine in which games are played like on any other gaming machine by providing (monetary) value to the device and activating the game(s). A game consists of a first phase in which the ticket dispenser determines if this game will be won or lost. In the case of a loss this (first) phase is already the game; in the case of a win the ticket dispenser enters a second phase where it issues a winning ticket in the form of a scratch ticket coupon (normally one, but if desired several). Ticket packs are made up only of win ticket coupons onto which the full security of a scratch lottery ticket is applied.

The ticket dispensing function:

Ticket Storage

Storage of two ticket packs 70, 72 per dispensing slot 50, 52 and from one to several dispensing slots per unit. Automatic switching to reserve pack 72 when first pack 70 ends. Indication of pack empty—LED on ticket dispenser and per Ethernet.

Ticket Transport

Pre-dispensing slot transport by one rubber shaft 104 and one solenoid 164, 166 per ticket strip 74, 98. Normally two ticket strips (packets) per shelf. To transport a ticket the appropriate solenoid 164, 166 for that ticket web 74, 96 is activated and the rubber shaft 104 rotates in the appropriate direction 110, 170 and transports the ticket through the mouth 173 of an internal feed channel of the ticket dispenser.

Ticket Web Loading

Manual filling of ticket packs 70, 72 until stop 163, 165. Optical OK Indication by indicators 216.

A first light barrier or other sensor 171, 177 can be used to detect ticket web is loaded and that first ticket is pushed until stop 163, 165 and a second light barrier sensor 175, 179 can be used to detect pushing the leading ticket beyond the stop.

Separating Tickets

The ticket strip 74, 98 is transported forward by the main shaft 104 until the leading ticket edge reaches the bender 112, and is then transported by the main shaft 104 and the ticket bender shaft 116 until the perforation is positioned some mm outside the mouth 173.

Then the ticket bender 112 turns the ticket to be separated by ±90° thus bending the ticket web along the perforation line by ±90°. The primary shaft 104 and the solenoid 164, 166 for this web then pull the ticket web 74, 98 back until the bent edge stops at the mouth 173 where, due to the stiffness of the ticket material, the web cannot be pulled back further. The transport then positions the web 74, 98 forward until the bent edge is placed at the position of the separator wheel. This sequence allows a precise detection of the perforation and synchronizes the perforation edge with each ticket 108, 108' spent.

The ±90° bend weakens the perforation. Then the ticket bender 112 turns the ticket to be separated back to ± starting position thus further weakening the perforation.

A blunt separator wheel 184 on a sledge 186 driven by a belt 188 slides along the perforation and breaks up the perforation.

Dispensing Tickets into the Pickup Tray

The separated ticket 108, 108' is then dispensed into the pickup tray by the bending shaft 116. Prior to dispensing the ticket 108, 108' into the tray the bender 112 and shaft 116 are turned into the right position.

Last Ticket of a Strip

The light barrier sensors 175, 179 can detect the last ticket as its trailing edge passes through. The dispensing mechanism pulls the ticket until the trailing edge is well outside the mouth 173 (reserve) and then issues the ticket 108, 108' into the tray by turning the bender 112 and shaft 116 in the right (dotted-line) position.

Ticket Dispensing

Fanfold tickets are used.

Two ticket packs 70, 72 per ticket dispensing position, one pack for dispensing, one pack as reserve or empty waiting for a refill, to make a once-per-period, such as a day, refill operation possible for a larger installation. All ticket webs 74, 98 of one unit are separated along the perforation by a single separator mechanism.

The tickets from either of the two packets are output by the same mechanism, from the same mouth 173, into the same grip tray 112, using the same space for folding up of the two webs.

Ticket separation and dispensing by one mechanism.

Shared rubber shafts 104 for the webs 74, 98 of both packs, transport of single web 74 or 98 selected by two solenoids 164, 166.

Ticket loading and holding of web-ends by spring-loaded lever 142, 144.

Sensors for the leading and trailing edges of both webs within the output mechanism.

Spending all tickets from the first to the last.

Seamless switch-over from last ticket of one web to the first ticket of the other web.

Sensor for jammed tickets in the mouth 173.

Cut Single Tickets

Alternatively to fanfold ticket packs, cut single ticket packs may be used.

In this case two or more ticket stacks per ticket dispensing position allow to share the dispensing mechanism and electronics for several packs of tickets.

Arranging the ticket packets in form of a carousel.

Seamless switch-over from last ticket of one stack to the first ticket of the other stack into the same grip tray.

Prize/bonus Ticket Games

A prize/bonus game consists of a first phase in which the unit determines if this game will be a won or a lost game. In the case of a loss this (first) phase is already the game; in the case of a win the unit enters into the second phase where it dispenses a (normally one, but as well several) win scratch ticket coupon. Prize ticket packs 70, 72 are made up only of winning ticket coupons onto which the full security of the scratch lottery ticket system is applied (see security).

The winning decision is controlled by secure game algorithms stored in a chipcard, or at least the decisive parameters are stored in a chipcard.

For a won game the unit will issue a win ticket; for a lost game no ticket is issued, only some light effects are visible on the unit similar to those on a slot machine. The non-win tickets of the classical scratch ticket lottery are gone.

Indicating the winning-losing decision phase by optical and/or acoustic effects on any part of the ticket dispenser unit such as display, headphone, other. A distant, larger, optical-acoustical sign can also show the game outcome.

Thus the present invention provides a gaming unit on which a game is divided into:

a) a winning-losing decision phase in which a won or lost game is determined;

b) a win issuing phase where the prize/bonus or win is issued in the form of a win/prize ticket or coupon preferably in the form of a scratch ticket.

Tickets are stored within the gaming unit.

Security

Ticket verification and authentication

Ticket Type Verification

The tickets have on their rear side (alternatively front side) a barcode so that it can be read while transporting the ticket web 74, 98 past the reader 106.

The second ticket web of the shelf (if existing) is pulled back by the rubber shaft 104 and an activated solenoid 164, 166 until the loading stop to free the mouth 172 for the new web to be checked.

To verify the new ticket pack the web 98, 74 is transported forward by one ticket, the barcode is read and the ticket is pulled back to the loading stop.

The barcode is checked against the smart card for that shelf (or pack) inside the smart card.

Ticket Pack Authentication

Lottery ticket packs must be authenticated with the lottery organization or for promotional tickets with the promotion or ticket dispenser operating organization before the first ticket is sold to a customer. This is normally done by reading the barcode of the ticket pack as described above with the reader 106 and forwarding the ticket code via the network to the lottery computer or the computer of the ticket dispenser operating organization where the number series of the tickets of this pack is then made valid.

The unit with the system might optionally check if the ticket numbers read are from a validated pack.

Counting of Tickets

To ensure the pack is complete.

Verifying Ticket Numbers

Tickets within a pack are sequentially numbered. The unit might read the numbers and ensure that all tickets from one pack are sequentially numbered to ensure that no ticket is missing or that two webs are not glued together.

Ticket barcode validation of ticket webs by the unique number of each ticket of the web is done against the number range stored in the chipcard and by algorithms preferably also executed within the chipcard. One chipcard is provided per pair of webs for one dispensing position in the unit.

When ticket packs are newly loaded, they are first authenticated with the lottery computer. Thereafter validation and dispensing of tickets takes place after a successful session with the lottery computer without separate external validation procedures, but rather with internal validation procedures. Thus, authentication takes place after loading of a new ticket web in conjunction with the lottery computer, and validation takes place for every ticket issued by counting and sequence checking of the tickets within a pack. This is done by reading the unique ticket number of every ticket dispensed, and verifying the sequence of tickets by their incrementing numbers, and by counting the number of tickets of a pack and verifying against the figure stored within the chipcard.

The ticket dispenser combines several or all of the following functions:

Prize/bonus Competitions

Whenever a predefined purchase is captured at the point of sale terminal, ticket dispenser will perform a prize/bonus competition in the form of a Prize/Bonus Ticket Game (PBTG) as described. Promotions and predefined purchases can be:

Store or chain of stores promotion. Basically any article and value may trigger a PBTG.

Brands and or articles promotion. Predefined brands and or articles will trigger a PBTG.

Happy hours promotion. Special happy hours promotions may only be active during promotional times or a standard promotion will be given a higher win chance during promotional times.

Ad hoc promotions activating the above promotions at random time periods or these ad hoc promotions can be remotely triggered by the system network.

Loyalty promotion. An identified VIP—by loyalty card—will trigger or influence the winning chance of a PBTG.

Attributes to influence the winning chance of a promotion besides happy hours and VIP can be the purchase value.

The Advertising Media

The advertising media is the ticket dispenser housing design itself, a built-in display and sculptures put on or over the housing.

The unit holds or has put over itself one or several displays, sculptures and attention attractors of the following types:

A printed back-lighted display whereby the transparency holding the advertisement has to be easily exchangeable. This form is similar to the top glass of a gaming machine.

A smaller electronic display used e.g. to show jackpot values of a PBTG.

An electronic display like the TFT or similar notebook screens with a larger display area.

A sculpture put over the housing or at least parts of the housing to totally or partly change the appearance of the unit within short intervals.

Light effects on the display and or sculpture and or housing.

Acoustic effects.

Scratch Lottery Ticket (SLT) Vending

One or several ticket web positions can hold SLT webs. The vending starts with the customer placing a teaser on the conveyor belt which is scanned in by the cashier, or by the cashier entering the ticket purchase into the point of sale terminal.

Upon completion of the point of sale transaction with that customer the unit is triggered by the point of sale terminal to issue the tickets as registered.

The tickets issued are separated, and single tickets dispensed into the grip tray of the unit where they can be picked up by the customer.

Gaming Unit

The unit in this case is a gaming machine performing primarily PBTGs.

The unit is much lower in cost than a usual gaming machine and because of that it can be played with low wagers economically.

The unit is much smaller than a gaming machine so that it can be placed on counters and tables.

The unit can be an excellent promotion medium which can appear in the most different shapes by creating various housings following the Swatch concept.

The gaming unit performs the PTGs when sufficient monetary value is loaded to the unit and a trigger is activated. A prize or win is issued in form of a prize ticket.

Loading monetary values to the gaming unit is done by a chipcard holding the funds or by electronic funds transfer (EFT) from a remote station triggered by the attendant. The chipcard itself is loaded on a separate chipcard loading station.

The top prizes can be made progressive in all the variations of jackpots of gaming machines.

The chipcard may be used as loyalty cards holding the player's identification and possibly his loyalty values.

The Advertising Media

Because of the size and placement possibilities of the gaming at a bar counter/table the housing of the gaming unit is an excellent advertisement medium. The advertising medium is similar as described for the ticket dispenser; the form of the ticket dispenser could be shaped in similar style and variety as the tap levers in England and elsewhere.

The ticket dispenser installation potential is about 20% to 40% of the installed point of sale terminals in all kinds of retail stores. In order to be able to cope with the logistics and service of such a huge population the ticket dispensers are planned to be connected to the Internet, with a host system checking the ticket dispensers and service people having access to the ticket dispensers via the host by Internet and cellular phones with the wireless application protocol (WAP).

To achieve the Internet connectivity without special firmware, each ticket dispenser will be fitted with a one-chip-PC expediently running under embedded Linux. The ticket dispenser communicates with a radio link to the site network on which a ticket dispenser server exists. The ticket dispenser server is the very same one-chip-PC used as ticket dispenser controller. The ticket dispenser server can either communicate over the chain-wide data network or contains a GSM radio module by which the server communicates with the host from where Internet is accessed actively and passively.

Ticket dispensers are fitted with advertisements in form of transparencies or complete hoods. These promotion materials are optically encoded to be able to trace the timely placement of promotions via the net. An additional ticket dispenser feature will be active matrix or similar displays interactively reacting to the promotion and purchase of the customer. The displays can also be used for wide area progressive promotions. All multi-media handling is standard Internet standard software such as shockwave.

Host Software

The ticket dispenser system will require some host software. Most of it is standard company operational software with various add-ons. Here are the draft headlines of the host database and functions:

Promotion Customers contractual agreements with promotion customers ticket dispenser installed at stores per chain of stores contractual agreements with chain of stores ticket dispensers at service ticket dispensers on stock at service people and head office Logistic of Material to Sites ticket packs advertising transparencies and hoods stock control at head office and service points shipment proposal and execution Accounting promotions customers clients where ticket dispensers are placed prize promotions and advertisement campaigns Real-time Status and Journal ticket dispensers status and history journal Maintenance and Service Scheduling
  proposal by host modification by service dispatcher Help Desk
  to contact clients to help with the check on any ticket dispensers requiring ticket refills with wrong promotion transparencies or hoods not responding or out of service to contact clients to help with stock problems Scheduler
  Internet check of ticket dispensers promotions lottery games Internet Client
  actively connect to ticket dispensers accept mails from ticket dispensers authenticate ticket packs So far as e-commerce is concerned the present invention provides a method of promoting Internet shopping comprising the steps of:
  presenting a customer making a purchase via the Internet of either a service or a product with the opportunity to participate in a game of chance, either as a result of the purchase or at an additional charge,
  conducting a game of chance,
  advising the customer whether he has won or lost and, in the event of a win,
  transferring the win to the customer.

The step of transferring the win to the customer can comprise one of the following:
  reducing the charge for a purchase he has made,
  physically sending the customer a prize,
  operating a printer provided by the customer to print a voucher permitting redemption of a prize,
  providing an account for the customer with an entry permitting a rebate against a future purchase.

The method also includes the further step of displaying the operation of a ticket dispenser of the kind previously described. The step of displaying the operation of a ticket dispenser expediently comprises the provision on a screen of the purchaser of a representation of a ticket dispenser used at a point of sale.

Moreover, the method can include the step of displaying on a purchaser's screen the issue of a winning ticket from a ticket dispenser used at an actual point of sale. This can for example involve the step of displaying on a customer's screen a winning ticket capable of being stored or printed by the customer.

The ticket is preferably a covered ticket and the customer is given the possibility of uncovering the ticket. For example the winning ticket can resemble a scratch ticket and the customer can be provided with an electronic scraper, e.g. a mouse-operated scraper, for scratching said ticket.

The invention claimed is:

1. A ticket dispenser comprising a housing, a space within said housing for receiving a pack of tickets in the form of a continuous web of tickets, there being a line of weakness between adjacent tickets of said web, a dispensing mechanism for dispensing single tickets taken from said web of tickets, an electronic control associated with the dispenser and a conveyor roll which extends transversely to a web conveying direction, at least one wall means at one side of said conveyor roll and defining with said conveyor roll a passage for conveying said web of tickets, actuating means for pressing said wall means towards said conveying roll to clamp said web therebetween for conveying movement in said conveying direction and means for driving said conveyor roll to transport said web into a mouth having an outlet until said line of weakness joining a leading ticket to a remainder of said web is positioned in a vicinity of said outlet, and means disposed downstream of said outlet in said direction of conveying movement for bending a conveyed leading ticket of said web at least once about said line of weakness, to weaken a connection between said leading ticket and said web prior to severing said leading ticket from said web and issuing said leading ticket from said dispenser.

2. A ticket dispenser in accordance with claim 1, wherein said bending means bends said leading ticket about an axis aligned with said outlet by a single movement by about 90 degrees, thereby forming a bent edge, thereafter said conveyor roll is rotated in the opposite direction pulling said web back until said bent edge stops at a bezel where, due to the stiffness of the ticket material, the web cannot be pulled back further, and wherein said conveyor roll is then reversed again and positions the web forward until said bent edge is placed at the position of a separator mechanism, said bending mechanism then bends the leading ticket back, and said separator mechanism separates said leading ticket from said web prior to issuing said leading ticket from said dispenser through a dispensing slot for removal by a person at a dispensing position.

3. A ticket dispenser in accordance with claim 1 and having at least one said ticket dispenser mechanism and adapted to contain, for each ticket dispensing mechanism, first and second packs of tickets, wherein a first wall means is provided at one side of said conveyor roll and defines with said conveyor roll a first passage for conveying a first web of tickets belonging to said first pack of tickets, wherein a second wall means is provided at an opposite side of said conveyor roll and defines with said conveyor roll a second passage for conveying a second web of tickets belonging to said second pack of tickets, actuating means for pressing a selected one of said first wall means and said second wall means towards said conveying roll to clamp the respective said web therebetween for conveying movement in said conveying direction, and means for driving said conveyor roll in a first direction when said first web is to be conveyed and in a second direction when said second web is to be conveyed to produce in each case conveying movement of a selected one of said first and second webs in said conveying direction.

4. A ticket dispenser in accordance with claim 3, wherein a plurality of housing sections of similar design are provided adjacent each other and are each adapted to receive respective first and second packs of tickets, wherein said conveyor roll extends through all said adjacent sections and is drivable to convey a ticket from any one of said packs of tickets, a specific ticket being selected by actuation of said actuating means associated with said ticket to bring said ticket into conveying contact with said conveyor roll.

5. A ticket dispenser in accordance with claim 1 and including a separating wheel for pressing against said weakened connection and for movement transverse to said direction of conveying movement of said web to break said web along said weakened connection.

6. A ticket dispenser in accordance with claim 1 containing for each ticket dispensing mechanism at least first and second packs of tickets, said dispensing mechanism being adapted to automatically change over from said first pack of tickets to said second pack of tickets.

7. A ticket dispenser in accordance with claim 1, wherein said first and second webs of tickets are present in fanfold form, are provided in said dispenser housing on either side of a separating plane, and are disposed above said conveying roll in an operating position of said ticket dispenser.

8. A ticket dispenser in accordance with claim 1, wherein a respective spring-loaded clamping plate is provided for each said web upstream of said conveyor roll for clamping each said web against the respective one of said first and second wall means.

9. A ticket dispenser in accordance with claim 1, wherein said actuating means comprises a respective solenoid-operated plunger for moving each said wall means.

10. A ticket dispenser in accordance with claim 1 and including a transceiver for communicating by one of a wire or wireless means, a radio link, a short-range radio link and an infrared link from a transceiver disposed remote from said ticket dispenser.

11. A ticket dispenser in accordance with claim 1 and including a chip card containing ticket parameters for the tickets in the dispenser.

12. A ticket dispenser in accordance with claim 1, wherein said electronic control includes a chipcard associated with the pack of tickets and wherein information relating to said tickets is stored on said chipcard.

13. A ticket dispenser in accordance with claim 12, wherein said chipcard contains stored information relating to a game of chance.

14. A ticket dispenser in accordance with claim 1, wherein said electronic control comprises a random number generator for generating a random number in a range associated with a game of chance.

15. A ticket dispenser in accordance with claim 14, wherein said random number generator is contained in or controlled via said chipcard.

16. A ticket dispenser in accordance with claim 14, said game of chance having attributes, there being means for changing said attributes of said game of chance.

17. A ticket dispenser in accordance with claim 1, wherein means is provided for initiating a game of chance in response to an input.

18. A ticket dispenser in accordance with claim 1, wherein means is provided for operating at least one of an optical or acoustical signal each time a game of chance is won.

19. A ticket dispenser in accordance with claim 1, wherein said ticket dispenser is configured as a gaming machine.

20. A ticket dispenser in accordance with claim 1, wherein said ticket dispenser is adapted to issue lottery tickets in response to a purchase input.

21. A ticket dispenser in accordance with claim 1 including a plurality of outputs for dispensing at least one of the following items:
   a) a winning ticket in relation to a game of chance initiated in connection with a promotional activity,
   b) a lottery ticket following purchase of the same,
   c) a winning ticket in response to a game of chance initiated by a customer.

22. A ticket dispenser in accordance with claim 1 including a point of sale including a cash till, a bar scanner for scanning bar codes on items purchased by a customer, and means for transmitting information between the cash till and/or the bar scanner and the ticket dispenser.

23. A ticket dispenser in accordance with claim 22, wherein said means for transmitting information comprises a data network, an electronic interface for a radio or an infrared link.

24. A ticket dispenser in accordance with claim 1 wherein the pack of tickets is in one of a fanfold form and a roll form.

25. A ticket dispenser in accordance with claim 1 wherein the outlet comprises a mouth of a bezel.

26. A ticket dispenser in accordance with claim 1 wherein said line of weakness joining said leading ticket to the remainder of said web is positioned at or just beyond said outlet.

27. A ticket dispenser in accordance with claim 2 wherein said bent edge is defined by a bend at said line of weakness.

28. A ticket dispenser in accordance with claim 4 wherein the bending mechanism and the separating mechanism extend through all said adjacent sections.

29. A ticket dispenser in accordance with claim 10 wherein the wireless means comprises an Ethernet.

30. A ticket dispenser in accordance with claim 1 wherein said pack of tickets is in one of a fanfold form and a roll form.

31. A ticket dispenser in accordance with claim 1 wherein said ticket dispenser includes a dispensing slot disposed in said conveying direction after said outlet.

32. A ticket dispenser in accordance with claim 1 wherein each said line of weakness comprises a line of perforations.

33. A ticket dispenser in accordance with claim 14 wherein said random number generator has attributes and means is provided for changing said attributes of said random number generator.

34. A ticket dispenser in accordance with claim 1 wherein said bending means is adapted to bend said leading ticket to and fro about said line of weakness.

35. A ticket dispenser in accordance with claim 1 wherein means is provided for operating at least one of an optical or acoustical signal at least sometimes when a game of chance is played.

36. A ticket dispenser in accordance with claim 18 wherein said optical and/or acoustical signal is adapted to emphasize an advertisement.

37. A ticket dispenser in accordance with claim 35 wherein said optical or acoustical signal is adapted to emphasize an advertisement.

38. A ticket dispenser in accordance with claim 18 wherein said optical and/or acoustical signal is adapted to emphasize a promotional activity.

39. A ticket dispenser in accordance with claim 35 wherein said optical or acoustical signal is adapted to emphasize a promotional activity.

40. A ticket dispenser in accordance with claim 21 wherein said winning ticket is issued in connection with a purchase of one of a particular item and an item of a particular brand.

41. A ticket dispenser in accordance with claim 21 wherein said lottery ticket is issued in response to one of insertion of a coin and an input from a cashier at a cash till.

42. A ticket dispenser in accordance with claim 21 wherein said winning ticket is issued in response to one of insertion of a coin and to an input from a cashier at a cash till.

* * * * *